United States Patent
Mikawa

(10) Patent No.: US 9,614,313 B2
(45) Date of Patent: Apr. 4, 2017

(54) ELECTRICAL CONNECTOR HAVING A CONTACT WITH A FIXING PART PRESS-FITTED WITHIN A HOUSING

(71) Applicant: JAPAN AVIATION ELECTRONICS INDUSTRY, LTD., Tokyo (JP)

(72) Inventor: Kazuya Mikawa, Tokyo (JP)

(73) Assignee: JAPAN AVIATION ELECTRONICS INDUSTRY, LTD., Tokyo (JP)

( * ) Notice: Subject to any disclaimer, the term of this patent is extended or adjusted under 35 U.S.C. 154(b) by 230 days.

(21) Appl. No.: 14/381,481

(22) PCT Filed: Aug. 29, 2013

(86) PCT No.: PCT/JP2013/005115
§ 371 (c)(1),
(2) Date: Aug. 27, 2014

(87) PCT Pub. No.: WO2015/029088
PCT Pub. Date: Mar. 5, 2015

(65) Prior Publication Data
US 2016/0240953 A1    Aug. 18, 2016

(51) Int. Cl.
*H01R 13/40* (2006.01)
*H01R 13/41* (2006.01)
(Continued)

(52) U.S. Cl.
CPC ............. *H01R 13/41* (2013.01); *G03B 17/14* (2013.01); *H01R 12/714* (2013.01);
(Continued)

(58) Field of Classification Search
CPC ...... H01R 12/71; H01R 12/714; H01R 13/24; H01R 13/2428; H01R 13/2442; H01R 13/2478; H01R 13/41; H01R 13/2421
(Continued)

(56) References Cited

U.S. PATENT DOCUMENTS 5,980,335 A    11/1999  Barbieri et al.
6,299,458 B1   10/2001  Yamagami et al.
(Continued)

FOREIGN PATENT DOCUMENTS

JP    62-140528 U    9/1987
JP    S63-023776 U   2/1988
(Continued)

OTHER PUBLICATIONS

Chinese Office Action dated May 3, 2016, in connection with corresponding CN Application No. 201380011576.1 (19 pgs., including English translation).
Japanese Search Report dated Oct. 22, 2013 from corresponding Japanese Patent Application No. PCT/JP2013/005115; 3 pgs.
(Continued)

*Primary Examiner* — Chandrika Prasad
(74) *Attorney, Agent, or Firm* — Maier & Maier, PLLC

(57) ABSTRACT

The contact includes a contact protrusion that is inserted into the contact insertion hole protrudes from the optical axis direction partition wall into the camera lens module side, and functions as an electric contact for the camera lens module, a fixing part fixed to the housing, and a connection part that elastically connects the contact protrusion with the fixing part. The connection part includes a connection main body extending in the radial direction so as to recede from the fixing part, and a folding part disposed on the opposite side to the fixing part across the connection main body. The fixing part is disposed on the opposite side to the folding part across the connection protrusion in the radial direction.

10 Claims, 20 Drawing Sheets

(51) Int. Cl.
*H01R 13/24* (2006.01)
*H01R 12/71* (2011.01)
*G03B 17/14* (2006.01)

(52) U.S. Cl.
CPC ..... *H01R 13/2428* (2013.01); *H01R 13/2442* (2013.01); *H01R 13/2478* (2013.01); *G03B 2206/00* (2013.01)

(58) Field of Classification Search
USPC ........................................ 439/733.1, 71, 700
See application file for complete search history.

(56) References Cited

U.S. PATENT DOCUMENTS

| | | | | |
|---|---|---|---|---|
| 7,361,023 | B2* | 4/2008 | Wu | H01R 4/027 439/66 |
| 7,361,064 | B2* | 4/2008 | Chien | H01R 13/2471 439/824 |
| 7,918,671 | B2* | 4/2011 | Chen | H01R 13/2442 439/70 |
| 8,500,459 | B2* | 8/2013 | Niitsu | H01R 23/68 439/74 |
| 8,668,529 | B2* | 3/2014 | Park | H01R 12/714 439/700 |
| 9,281,584 | B2* | 3/2016 | Hashiguchi | |
| 2001/0036763 | A1 | 11/2001 | Funatsu | |
| 2001/0036764 | A1 | 11/2001 | Funatsu | |
| 2008/0214061 | A1* | 9/2008 | Zhu | H01R 24/58 439/733.1 |

FOREIGN PATENT DOCUMENTS

| | | |
|---|---|---|
| JP | H11329634 A | 11/1999 |
| JP | 2000-133353 A | 5/2000 |
| JP | 2001313129 A | 11/2001 |
| JP | 2009288336 A | 12/2009 |
| JP | 2010049174 A | 3/2010 |
| JP | 2013-182664 A | 12/2013 |

OTHER PUBLICATIONS

Japanese office action of Patent Application No. 2012-043446 dated Oct. 27, 2015, 7pgs.
Chinese Office Action dated Dec. 16, 2016, in connection with corresponding CN Application No. 201380011576.1 (17 pgs., including English translation).

* cited by examiner

ELECTRICAL CONNECTOR HAVING A CONTACT WITH A FIXING PART PRESS-FITTED WITHIN A HOUSING

TECHNICAL FIELD

The present invention relates to an electric connector.

BACKGROUND ART

As this type of techniques, as shown in FIG. 20 of the present application, Patent Literature 1 discloses a one-piece electric terminal 103 including a short contact part 101 with a cylindrical contact 100 formed therein, and an S-shaped spring arm 102. Further, the one-piece electric terminal 103 is configured so that the cylindrical contact 100 can move in a direction indicated by an arrow A in a state where the spring arm 102 applies a spring load to the cylindrical contact 100.

CITATION LIST

Patent Literature

Patent Literature 1: Japanese Unexamined Patent Application Publication No. 11-329634

SUMMARY OF INVENTION

Technical Problem

Incidentally, it has been desired to develop a technique for reducing electric connectors in size in the field of electric connectors used for camera lens mounts and other technical fields.

An object of the present invention is to provide a technique for reducing electric connectors in size.

Solution to Problem

According to a first aspect, the present invention provides an electric connector that is disposed and used in a camera main body for electrically connecting a camera lens module with the camera main body, the electric connector having a first direction (i.e. an optical axis direction) substantially in parallel with an optical axis of the camera lens module, a second direction perpendicular to the first direction as one specific direction among directions perpendicular to the first direction, and a third direction perpendicular to the first and second directions, the electric connector including: a housing with an elongated contact accommodation chamber formed therein along the second direction; and a contact that is accommodated in the contact accommodation chamber of the housing, in which the housing includes a module side partition wall that partitions off the contact accommodation chamber on a camera lens module side, a contact insertion hole being formed in the module side partition wall, the contact includes: a contact protrusion that is inserted into the contact insertion hole, protrudes from the module side partition wall into the camera lens module side, and functions as an electric contact for the camera lens module; a fixing part fixed to the housing; and a connection part that elastically connects the contact protrusion with the fixing part, the connection part includes a connection main body extending in the second direction so as to recede from the fixing part, and a folding part disposed on an opposite side to the fixing part across the connection main body and formed in a folded-back manner, and the fixing part is disposed on an opposite side to the folding part across the connection protrusion in the second direction.

The fixing part is press-fitted with the housing and thereby fixed to the housing.

The press-fitting direction of the fixing part to the housing is roughly the same as an insertion direction of the contact protrusion into the contact insertion hole.

The connection part further includes a connection base end for connecting a fixing part side end of the connection main body with a camera lens module side end of the fixing part.

The connection base end includes a curved part and an extension part, the curved part connecting to the fixing part and being formed in a folded-back manner, the extension part connecting to the connection main body and extending in the press-fitting direction.

The contact protrusion includes a contact protrusion main body formed so as to bulge into the camera lens module side, and a flange continuously formed without any gap along a peripheral edge of the contact protrusion main body.

The connection part further includes an elastic deformation regulation part that protrudes from the connection main body toward the contact protrusion and is able to come into contact with the flange of the contact protrusion.

The housing includes a pair of lateral partition walls that partition off the contact accommodation chamber on third direction sides, and the flange is formed so that the flange comes into contact with one of the pair of lateral partition walls in the third direction before the contact protrusion main body of the contact protrusion comes into contact with an inner circumferential surface of the contact insertion hole in a state where the flange is in contact with the module side partition wall by a spring restoring force of the connection part, so that the contact protrusion main body of the contact protrusion is unable to come into contact with the inner circumferential surface of the contact insertion hole.

The electric connector further includes a circuit board with an electrode pad formed thereon, the connection part being able to come into contact with the electrode pad when the camera lens module is attached to the camera main body.

According to a second aspect, the present invention provides an electric connector that is disposed and used in a first component for electrically connecting a second component with the first component, the electric connector including: a housing with a contact accommodation chamber formed therein; and a contact accommodated in the contact accommodation chamber of the housing, in which the housing includes a second component side partition wall that partitions off the contact accommodation chamber on a second component side, a contact insertion hole being formed in the second component side partition wall, the contact includes: a contact protrusion that is inserted into the contact insertion hole, protrudes from the second component side partition wall into the second component side, and functions as an electric contact for the second component; a fixing part fixed to the housing; and a connection part that elastically connects the contact protrusion with the fixing part, the connection part includes: a connection main body extending in the second direction so as to recede from the fixing part, the second direction being substantially perpendicular to a first direction, the first direction being a hole direction of the contact insertion hole; and a folding part disposed on an opposite side to the fixing part across the connection main body and formed in a folded-back manner, and the fixing part is disposed on an opposite side to the folding part across the connection protrusion in the second direction.

The fixing part is press-fitted with the housing and thereby fixed to the housing.

The press-fitting direction of the fixing part to the housing is roughly the same as an insertion direction of the contact protrusion into the contact insertion hole.

The connection part further includes a connection base end for connecting a fixing part side end of the connection main body with a second component side end of the fixing part.

The connection base end includes a curved part and an extension part, the curved part connecting to the fixing part and being formed in a folded-back manner, the extension part connecting to the connection main body and extending in the press-fitting direction.

The contact protrusion includes a contact protrusion main body formed so as to bulge into the second component side, and a flange continuously formed without any gap along a peripheral edge of the contact protrusion main body.

The connection part further includes an elastic deformation regulation part that protrudes from the connection main body toward the contact protrusion and is able to come into contact with the flange of the contact protrusion.

When a direction perpendicular to the first and second directions is defined as a third direction, the housing includes a pair of lateral partition walls that partition off the contact accommodation chamber on third direction sides, and the flange is formed so that the flange comes into contact with one of the pair of lateral partition walls in the third direction before the contact protrusion main body of the contact protrusion comes into contact with an inner circumferential surface of the contact insertion hole in a state where the flange is in contact with the module side partition wall by a spring restoring force of the connection part, so that the contact protrusion main body of the contact protrusion is unable to come into contact with the inner circumferential surface of the contact insertion hole.

The electric connector further includes a circuit board with an electrode pad formed thereon, the connection part being able to come into contact with the electrode pad when the second component is attached to the first component.

Advantageous Effects of Invention

According to the present invention, it is possible to reduce electric connectors in size.

Figure 3:
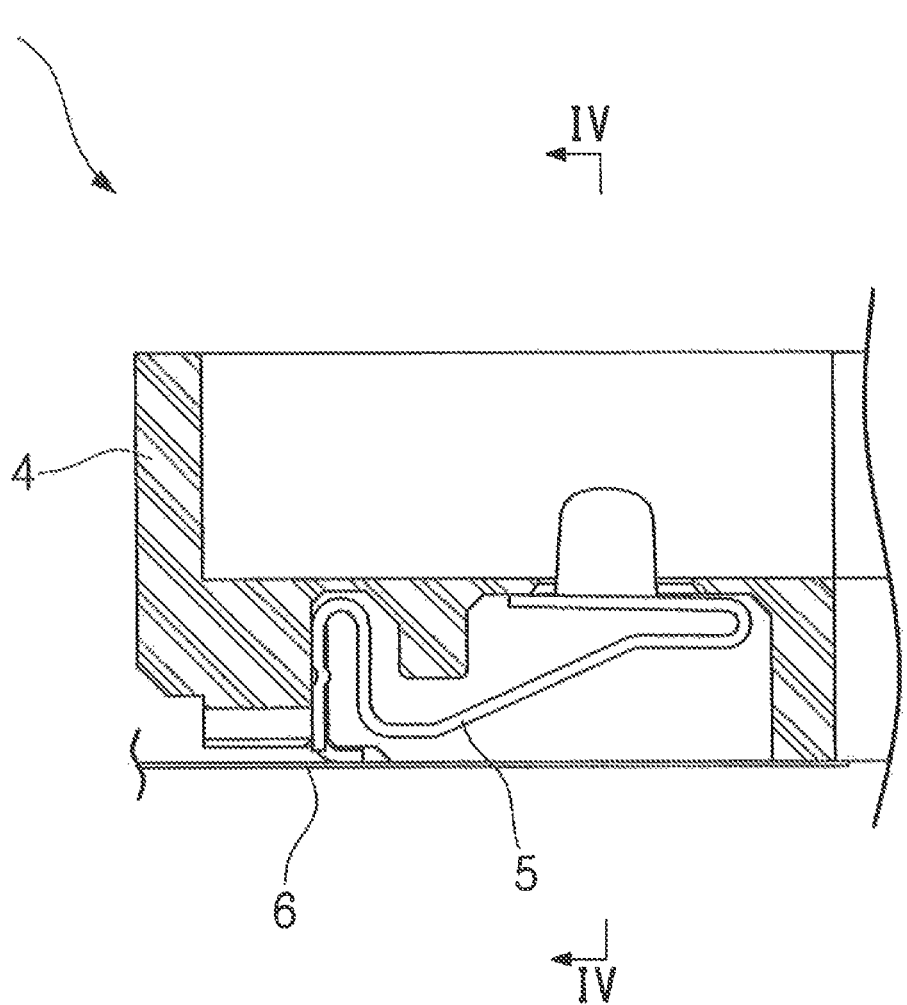
FIG. 3 is a cross section taken along a line III-III in FIG. 1 (first exemplary embodiment)
Figure 6:
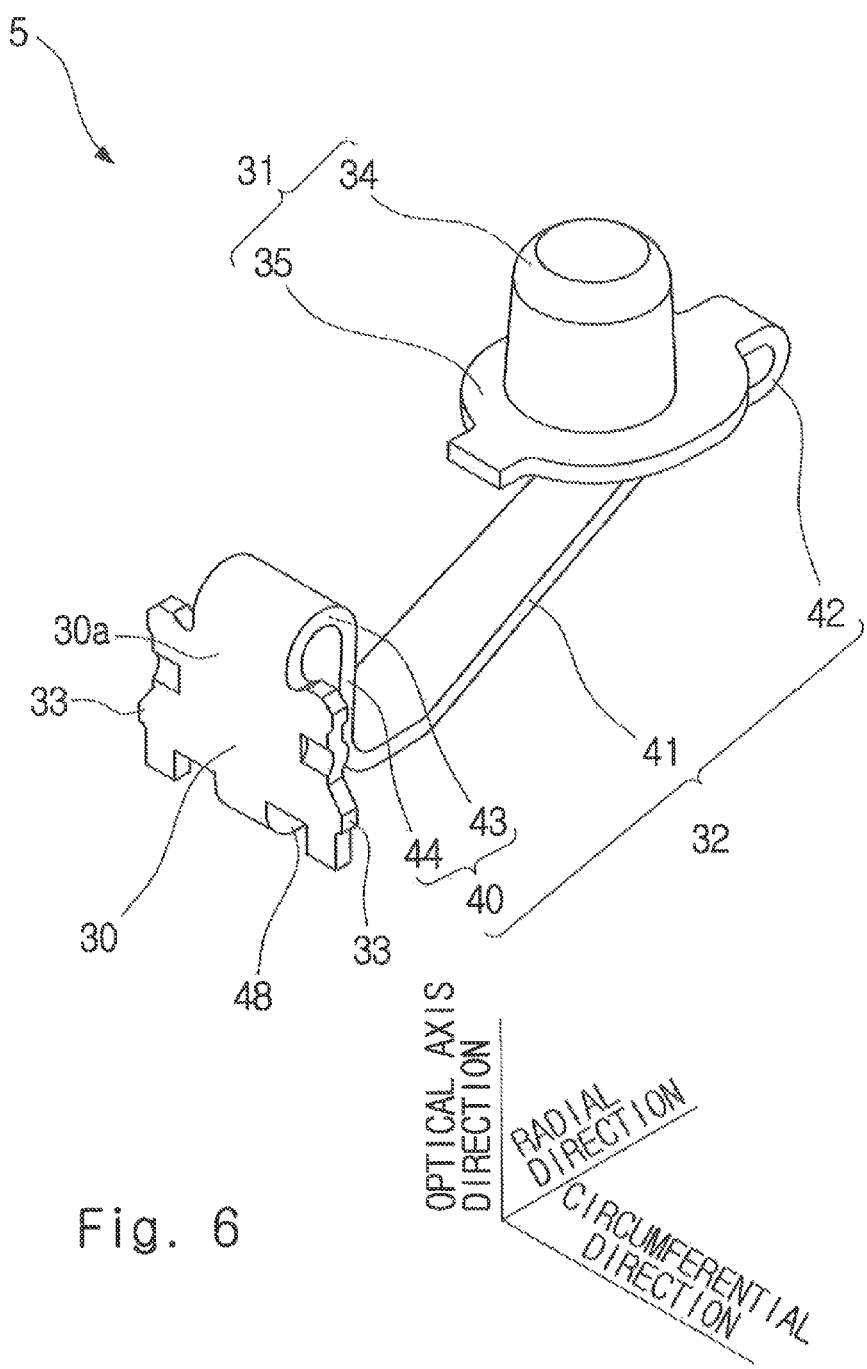
FIG. 6 is a perspective view of a contact (first exemplary embodiment)
Figure 10:
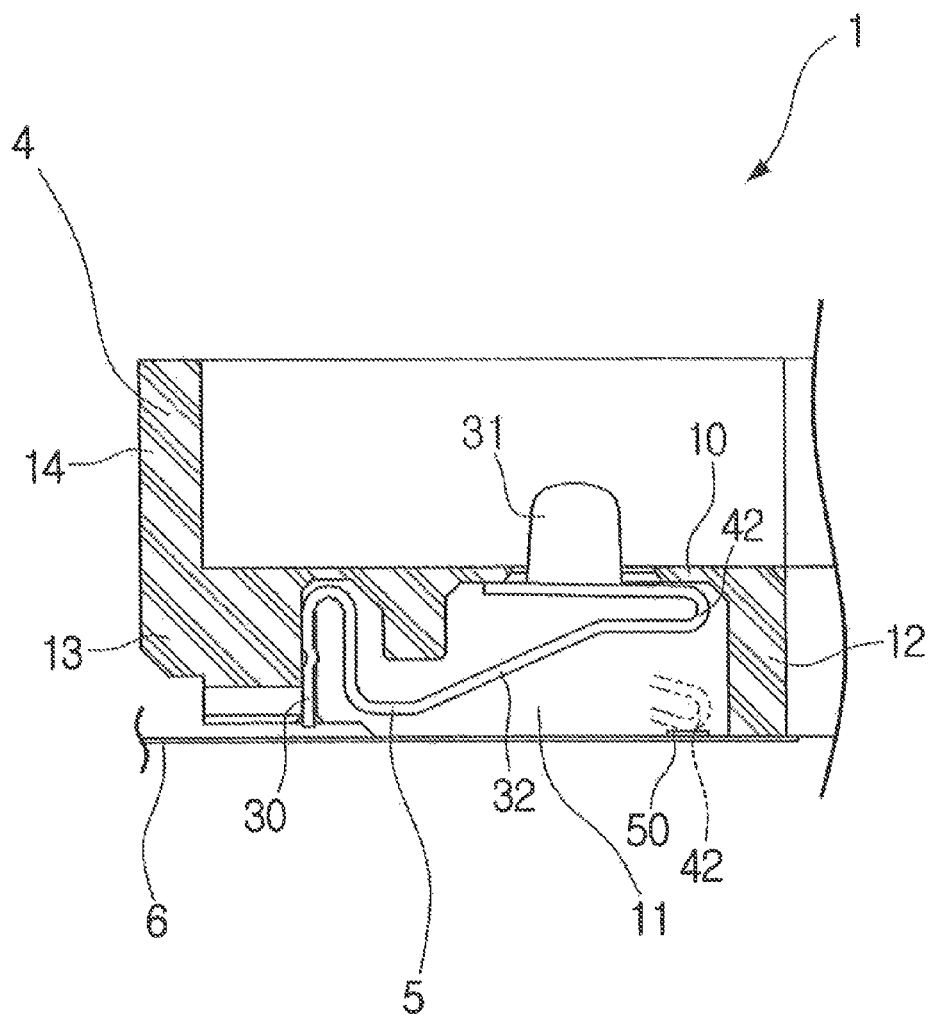
Figure 11:
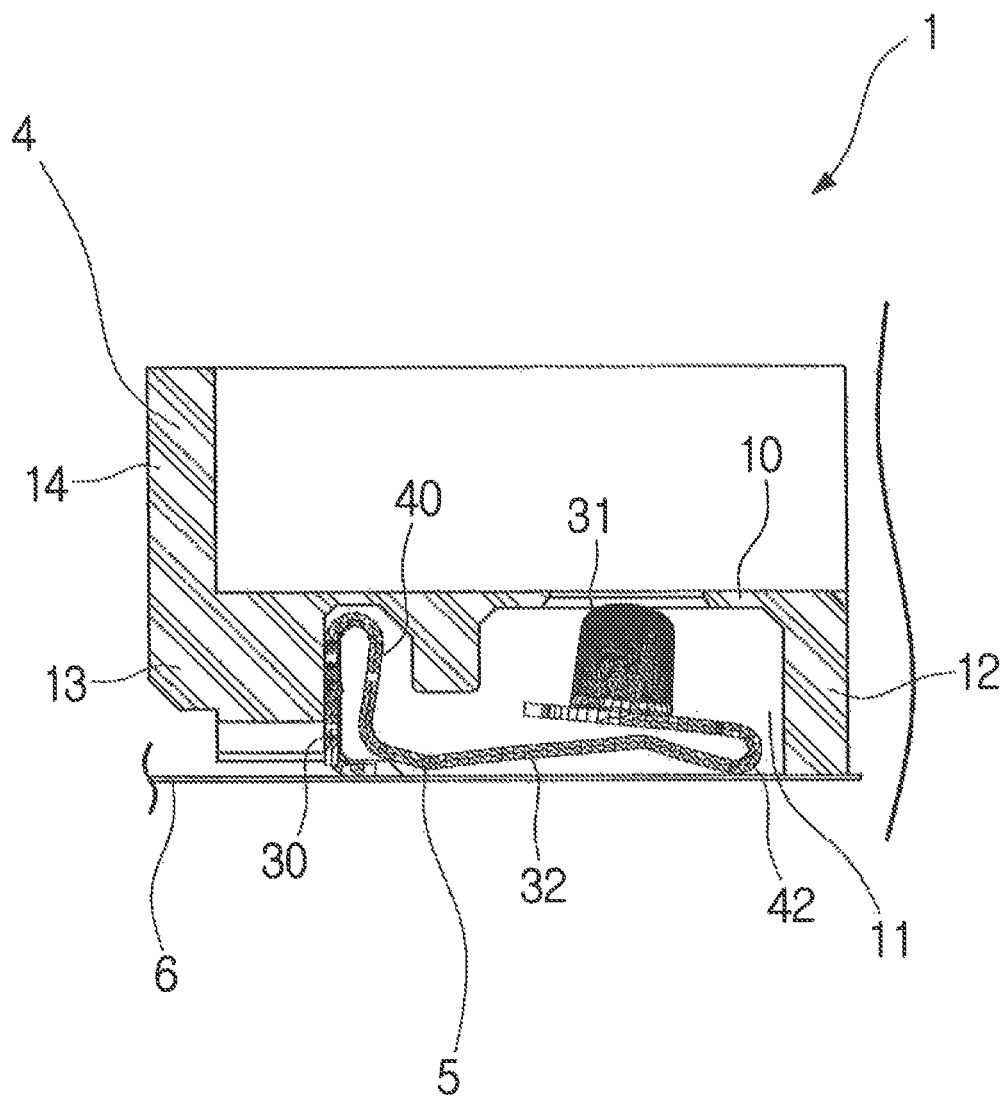
Figure 12:
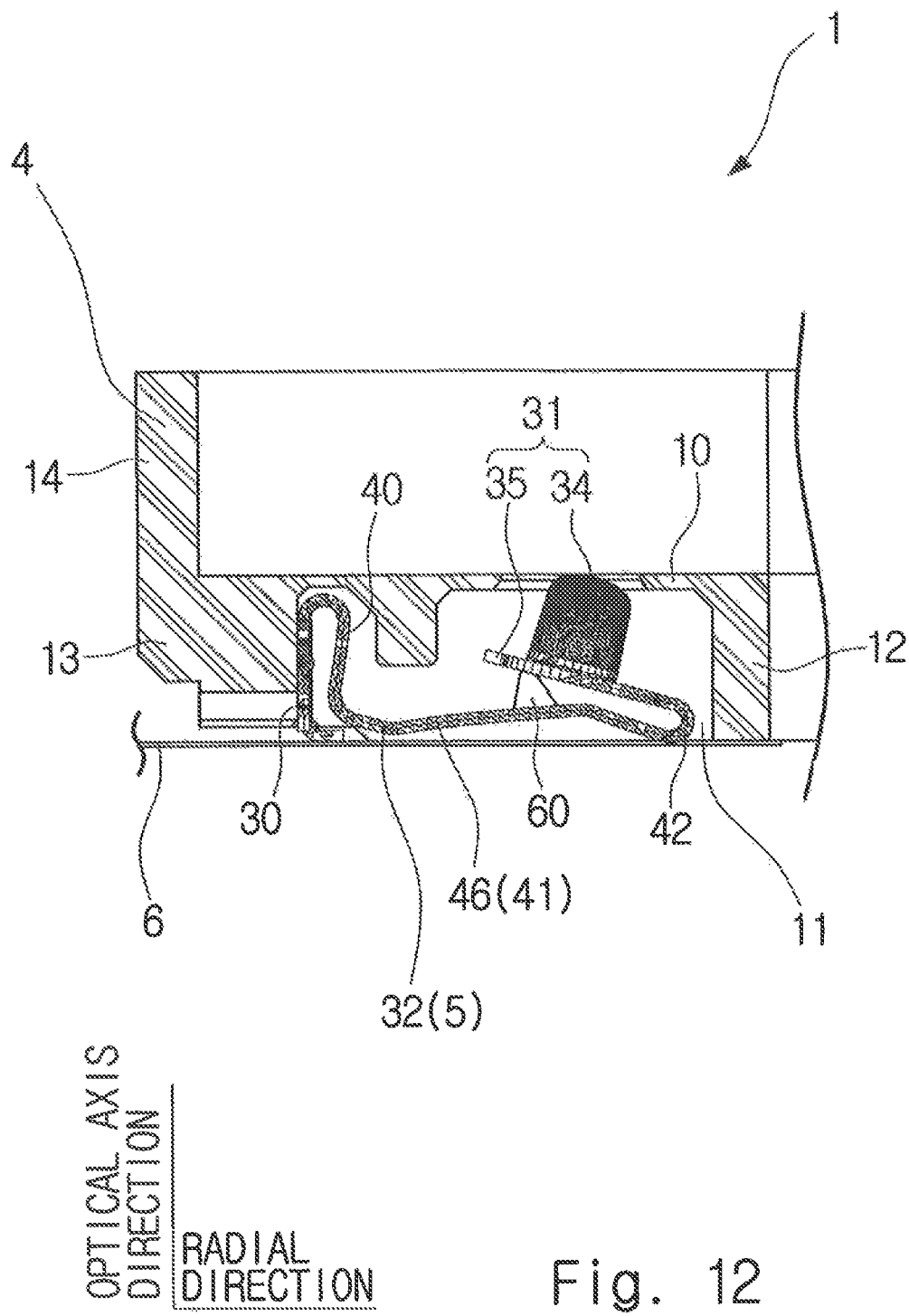
Figure 13:
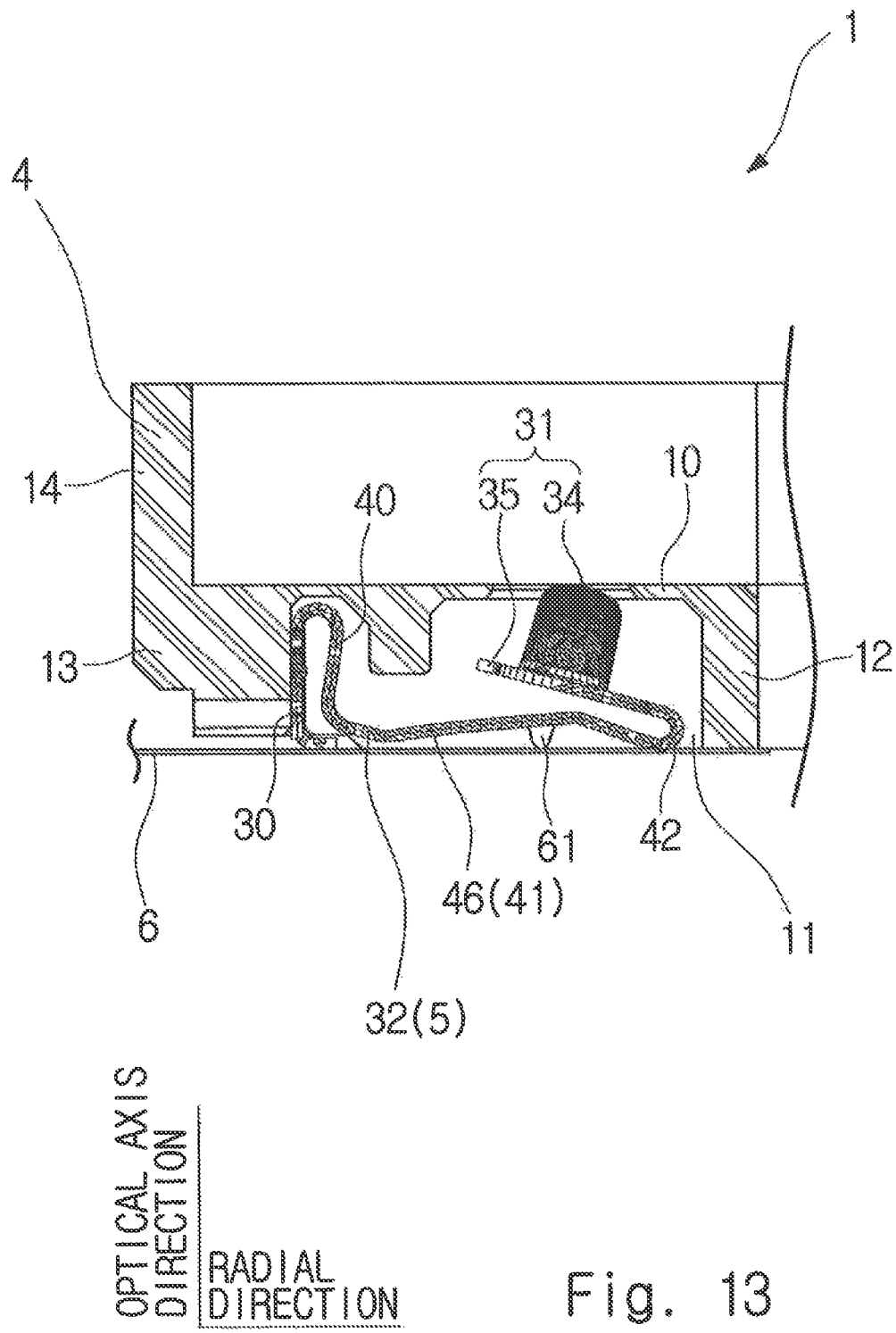
Figure 14:
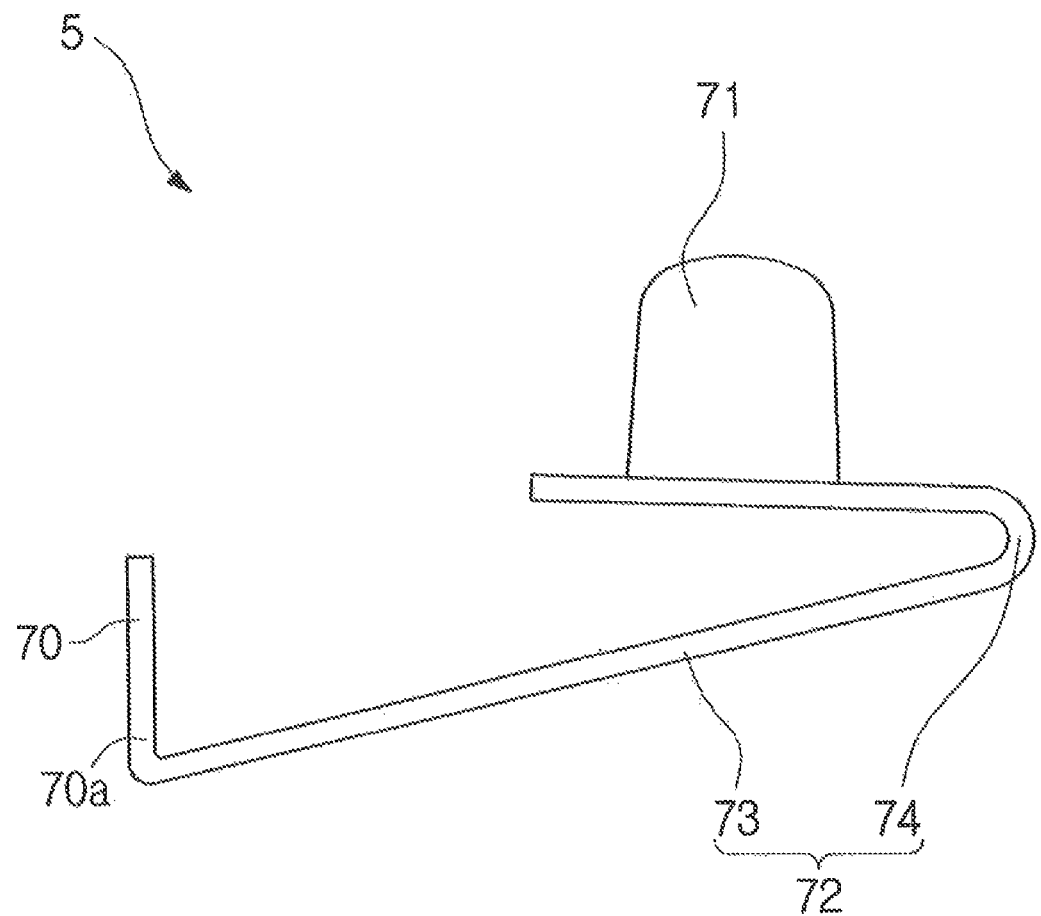
Figure 15:
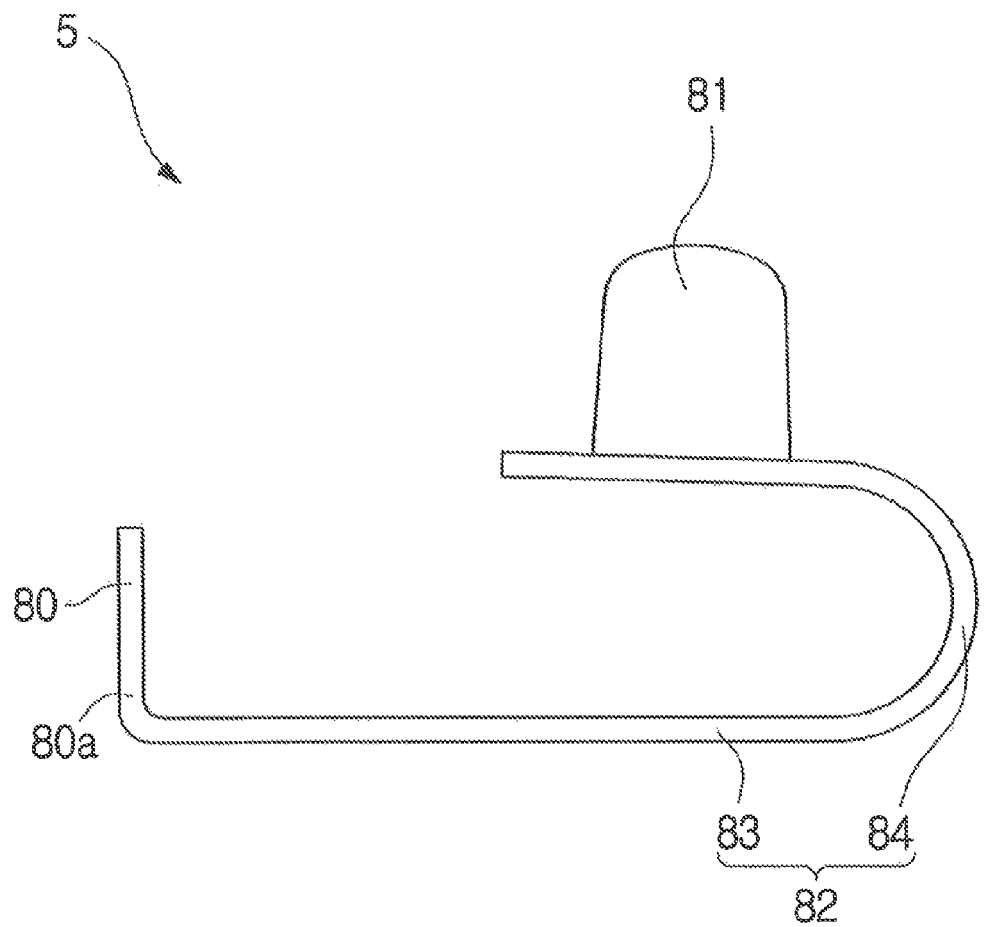
Figure 16:
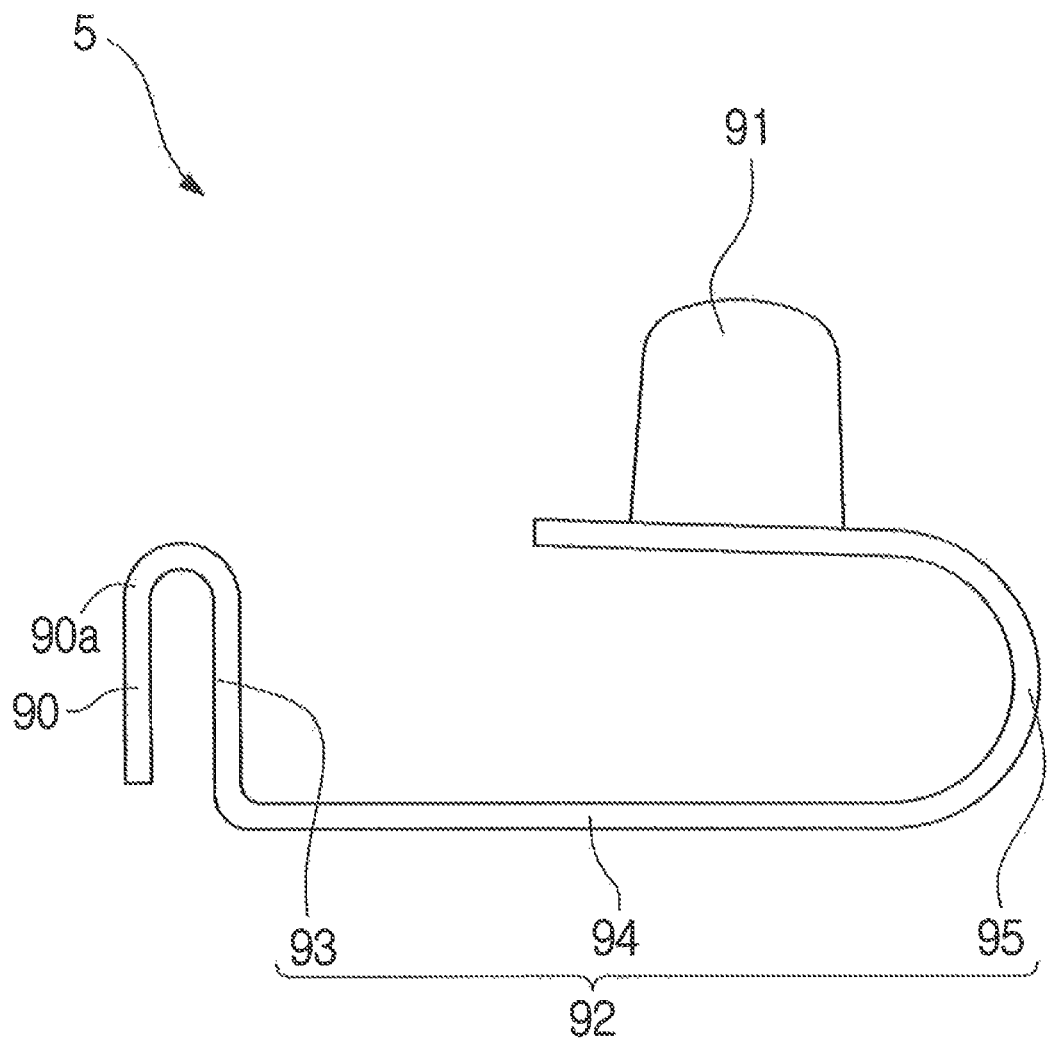
Figure 17:
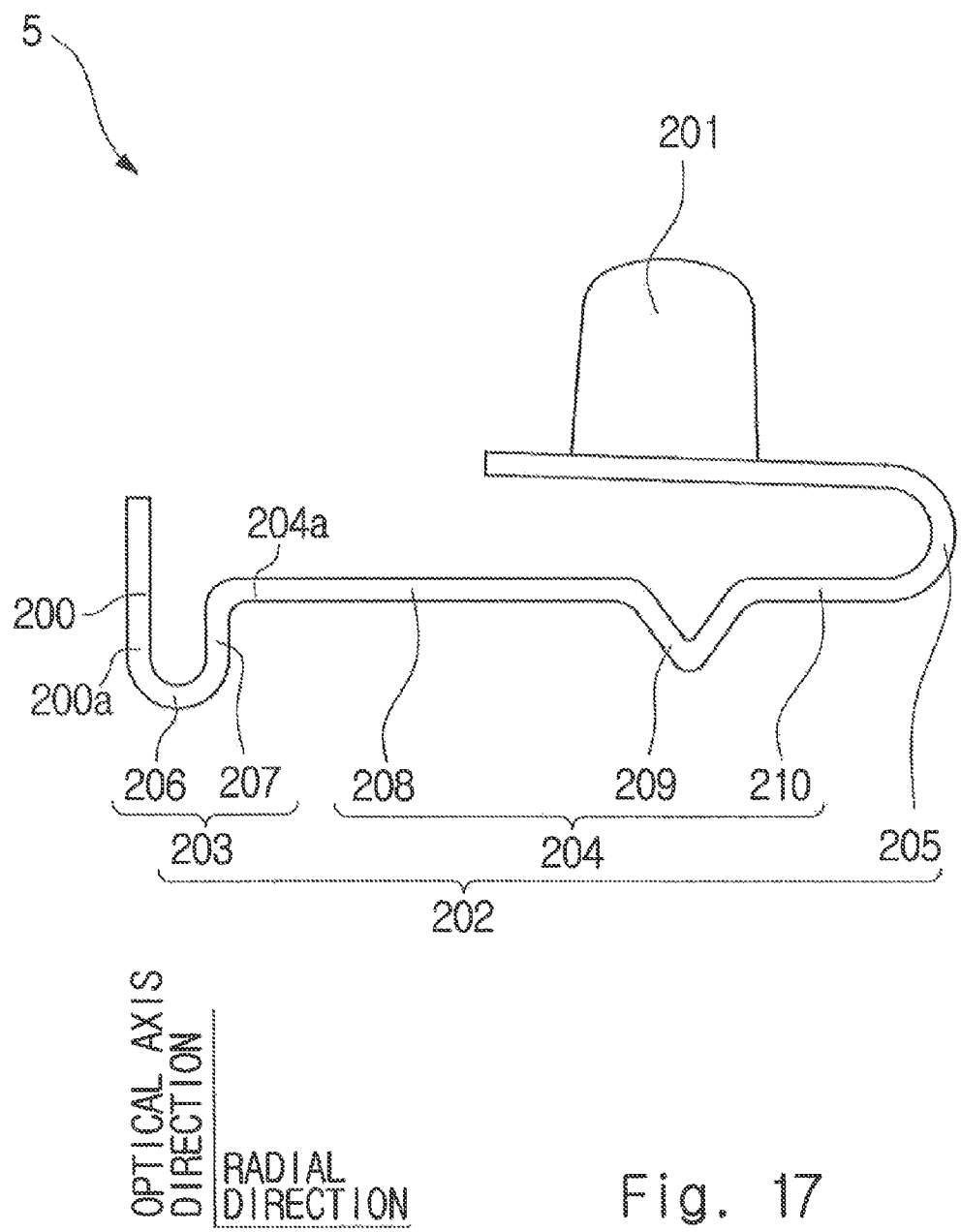
Figure 18:
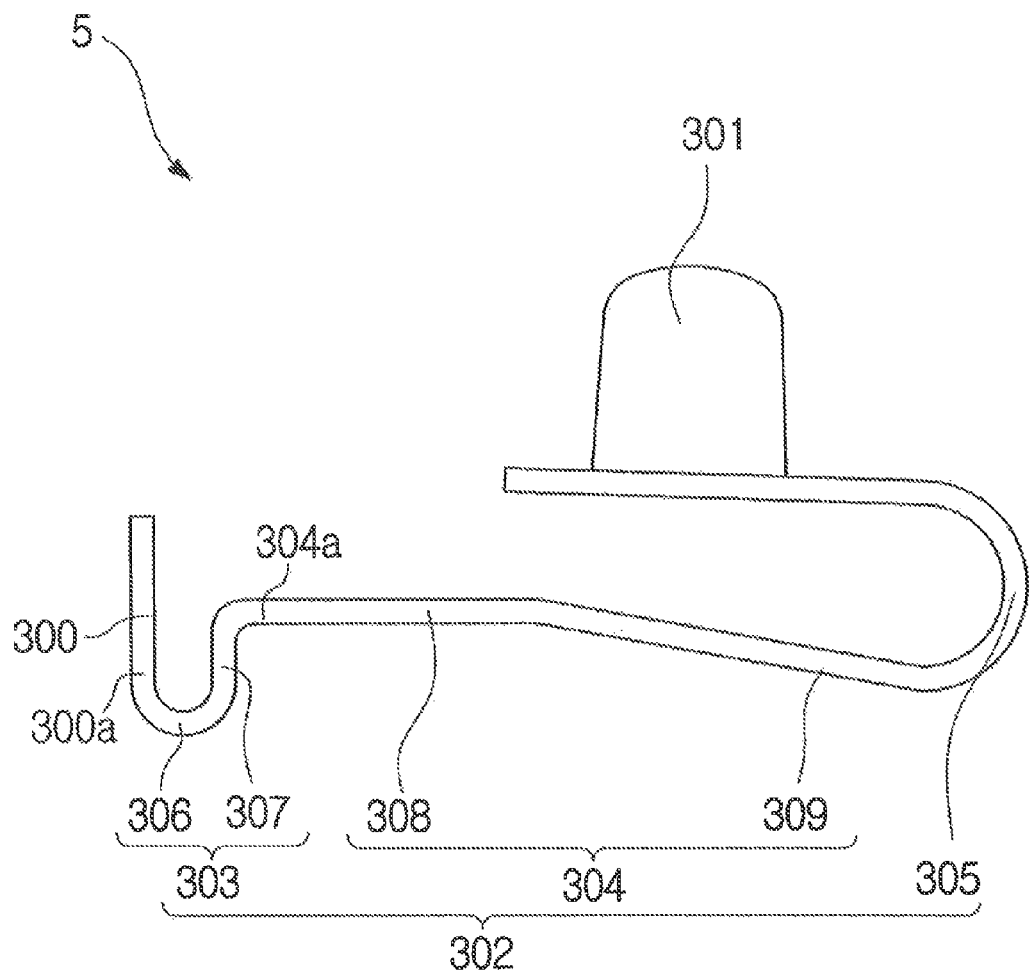
Figure 19:
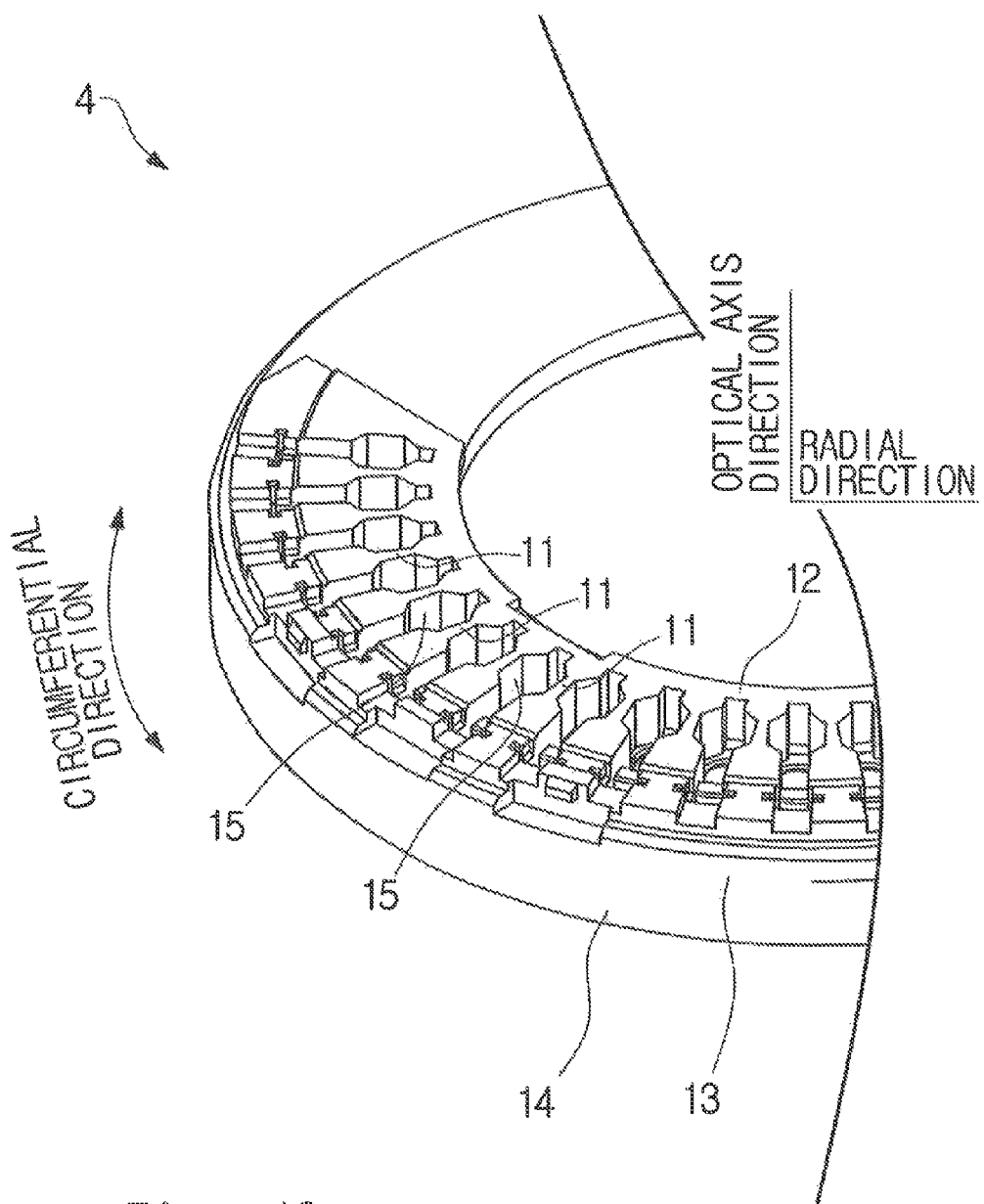
Figure 20:
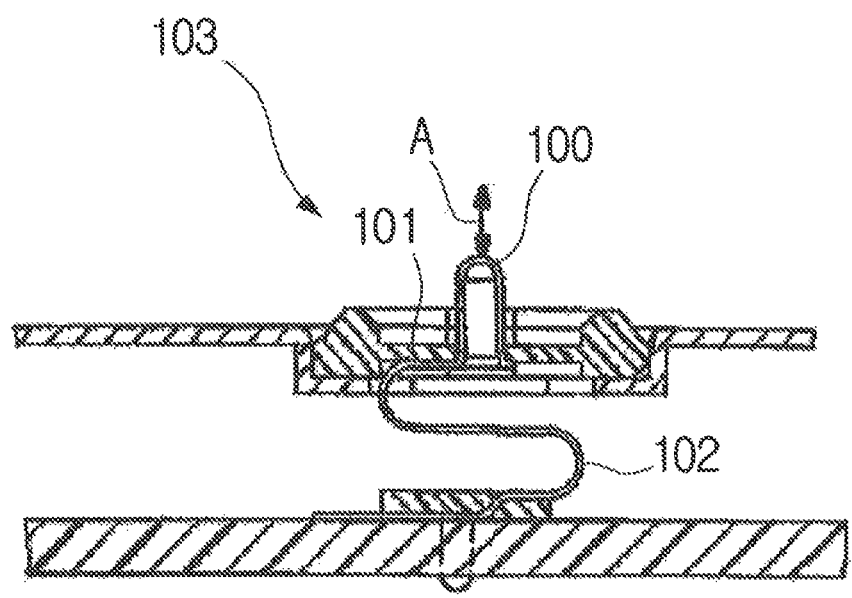

the mesh was used for a finite element method analysis (first exemplary embodiment);

FIG. 10 is a cross section corresponding to FIG. 3, in which the connection part functions as a contact for an FPC (second exemplary embodiment);

FIG. 11 is a cross section corresponding to FIG. 3 and shows a state where the contact is intentionally press down;

the mesh was used for a finite element method analysis (third exemplary embodiment);

FIG. 12 is a cross section corresponding to FIG. 3 and shows a state where the elastic deformation of the contact is restrained;

the mesh was used for a finite element method analysis (third exemplary embodiment);

FIG. 13 is a cross section corresponding to FIG. 3 and shows a state where the elastic deformation of the contact is restrained;

the mesh was used for a finite element method analysis (fourth exemplary embodiment);

FIG. 14 is a side view of a contact (first modified example);

FIG. 15 is a side view of a contact (second modified example);

FIG. 16 is a side view of a contact (third modified example);

FIG. 17 is a side view of a contact (fourth modified example);

FIG. 18 is a side view of a contact (fifth modified example);

FIG. 19 is a partial bottom view of a housing (first exemplary embodiment); and FIG. 20 corresponds to FIG. 6 of Patent Literature 1.

DESCRIPTION OF EMBODIMENTS (First Exemplary Embodiment)

A first exemplary embodiment according to the present invention is explained hereinafter with reference to FIGS. 1-9 and 19.

Figure 1:
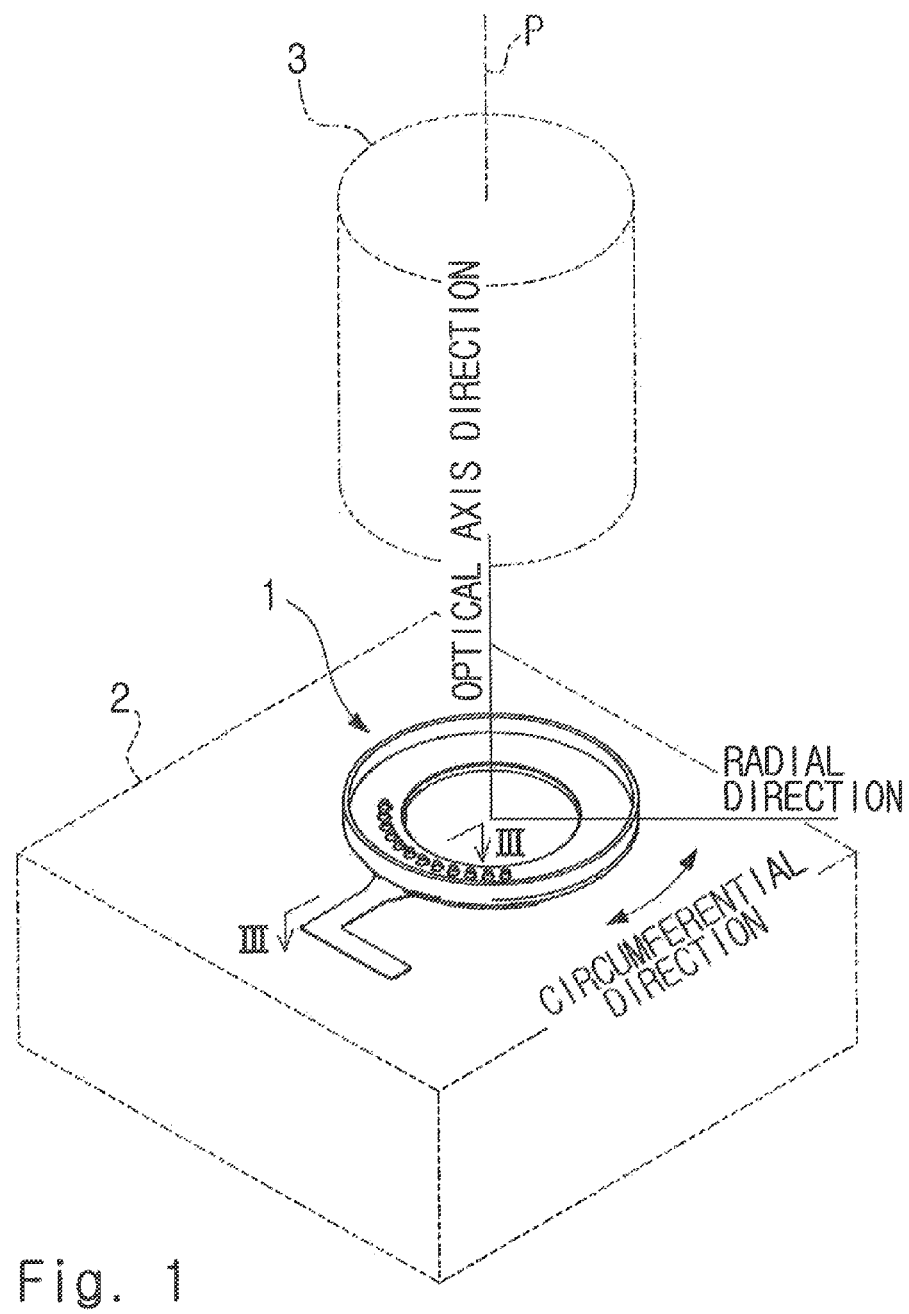
FIG. 1 is a perspective view showing a state where a camera lens module is detached from a camera main body (first exemplary embodiment)

As shown in FIG. 1, an electric connector 1 for a mount (electric connector) is disposed and used in a camera main body 2 for electrically connecting a camera lens module 3 with the camera main body 2.

Here, "optical axis direction (first direction), "radial direction (second direction)", and "circumferential direction (third direction)" are defined with reference to FIG. 1. The "optical axis direction" is a direction substantially in parallel with the optical axis P of the camera lens module 3. Of the "optical axis direction", the direction heading from the camera main body 2 toward the camera lens module 3 is defined as "subject direction" and the direction heading from the camera lens module 3 toward the camera main body 2 is defined as "counter-subject direction". The "radial direction" is a direction perpendicular to the optical axis direction and hence perpendicular to the optical axis P of the camera lens module 3. Of the "radial direction", the direction approaching the optical axis P of the camera lens module 3 is defined as "optical axis approaching direction" and the direction receding from the optical axis P of the camera lens module 3 is defined as "optical axis receding direction". The "circumferential direction" is a direction perpendicular to the optical axis direction and the radial direction. That is, the "circumferential direction" corresponds to a circumferential direction around the optical axis P of the camera lens module 3.

Figure 2:
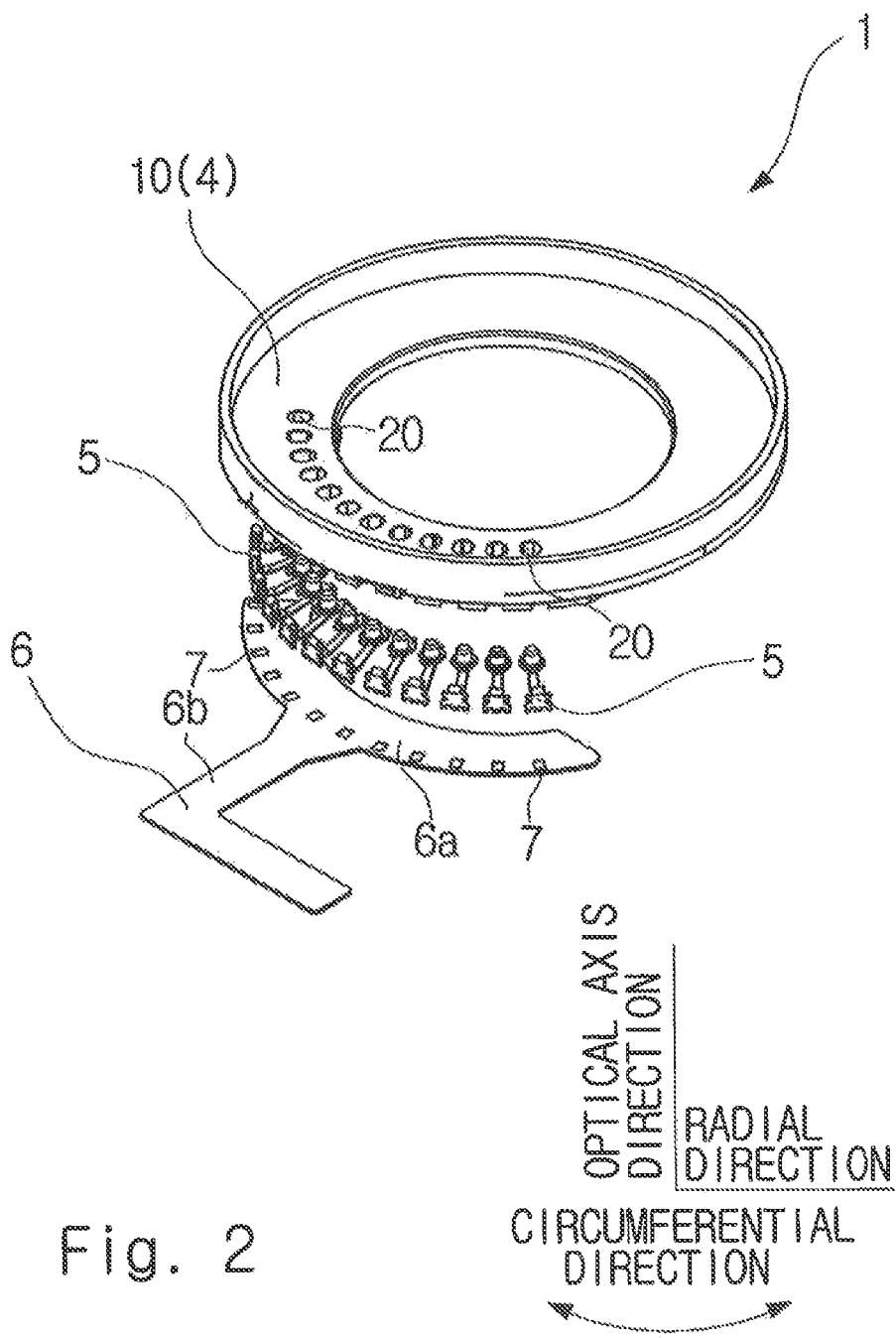
FIG. 2 is an exploded perspective view of an electric connector for a mount (first exemplary embodiment)

As shown in FIG. 2, the electric connector 1 for a mount (hereinafter called "mount optical connector 1") has the optical axis direction, the radial direction, and the circumferential direction.

(Mount Optical Connector 1)

As shown in FIG. 2, the mount optical connector 1 includes a housing 4, a plurality of contacts 5, and an FPC (Flexible Printed Circuit, circuit board) 6.

The housing 4 is formed of insulating resin or the like and has a ring shape around the optical axis. The plurality of contacts 5 are arranged along the ring-shaped housing 4. The FPC 6 includes an FPC arc part 6a extending in an arc shape so as to conform to the plurality of contacts 5, and an FPC lead part 6b extending from the middle in the longitudinal direction of the FPC arc part 6a. A plurality of electrode pads 7 are exposed on the subject direction side surface of the FPC arc part 6a. Each of the plurality of electrodes pads 7 is opposed to a respective one of the plurality of contacts 5.

Figure 4:
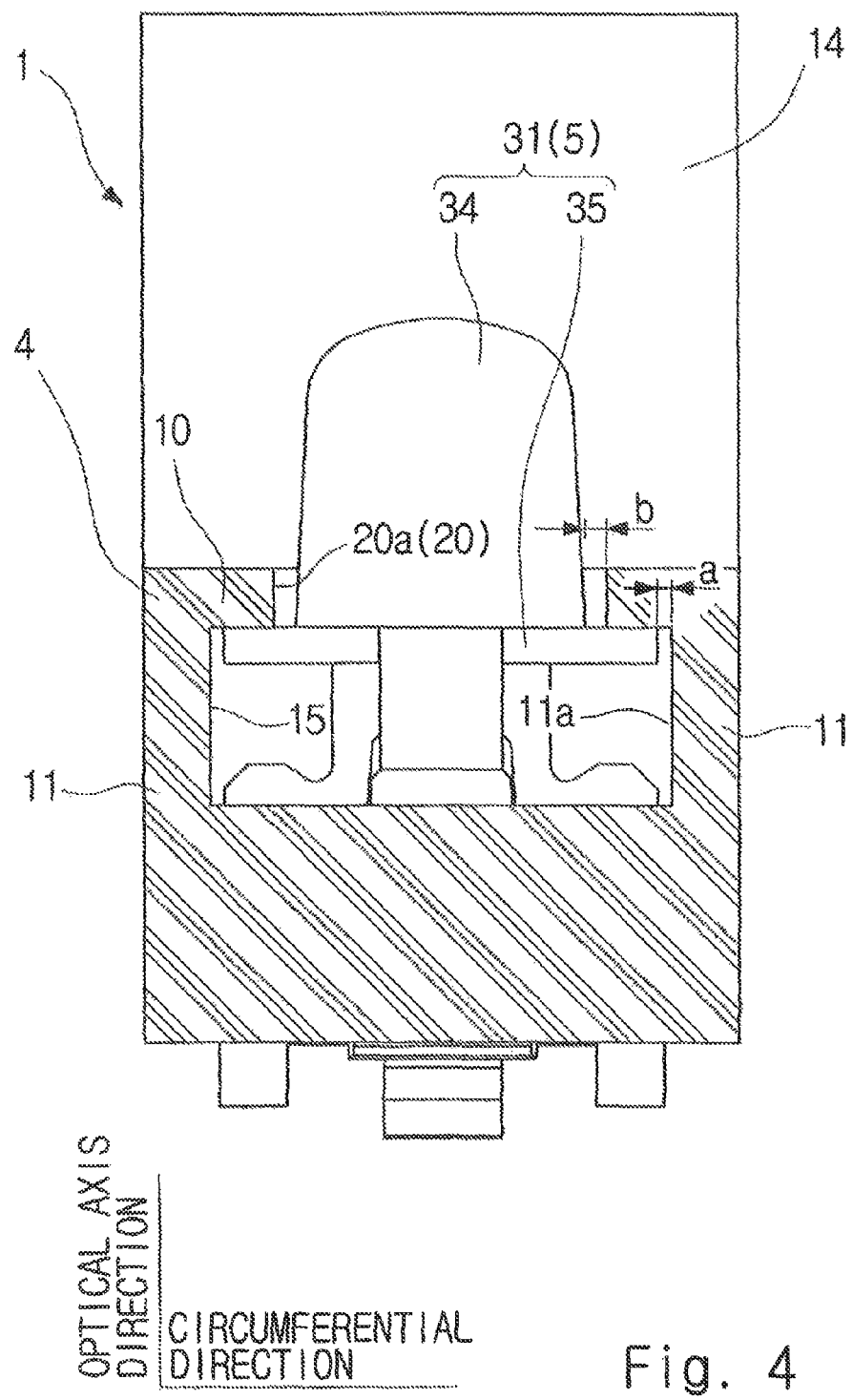
FIG. 4 is a cross section taken along a line IV-IV in FIG. 3 (first exemplary embodiment)

FIG. 3 shows a cross section of the mount optical connector 1 in a state where the plurality of contacts 5 and the FPC 6 are attached to the housing 4. FIG. 4 shows a cross section of the mount optical connector 1 in a state where the FPC 6 is detached. The configuration of the mount optical connector 1 is explained hereinafter in detail with reference to FIGS. 3 to 8.

(Housing 4)

Figure 5:
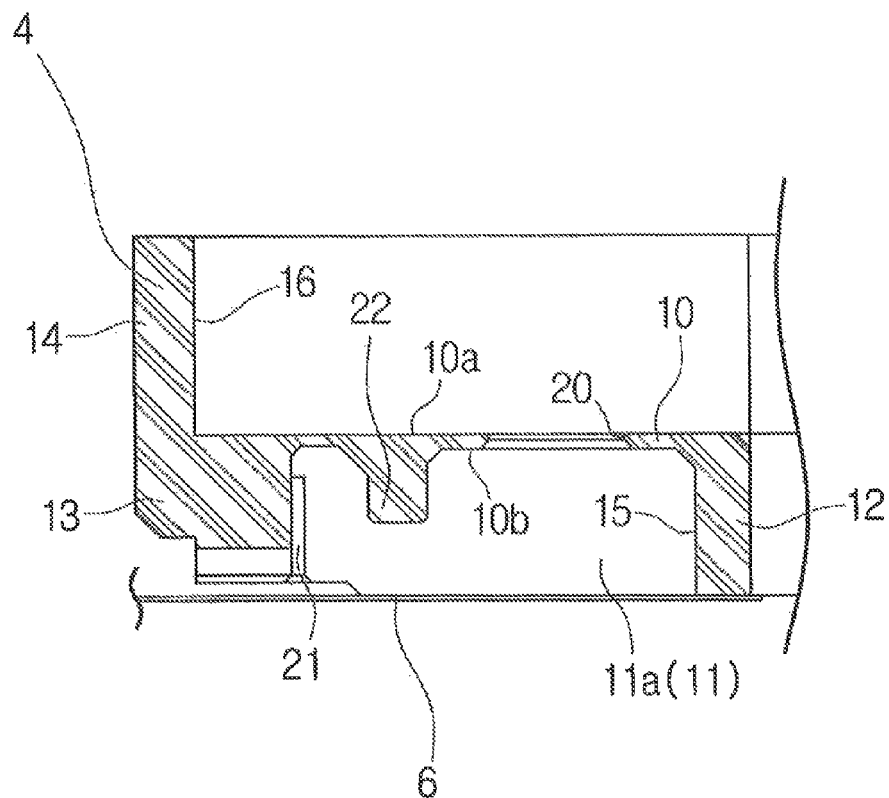
FIG. 5 is a cross section corresponding to FIG. 3, in which the illustration of the contact is omitted (first exemplary embodiment)

As shown in FIG. 5, the housing 4 includes an optical axis direction partition wall 10 (module side partition wall), a plurality of circumferential direction partition walls 11 (lateral partition walls), an inner circumferential wall 12, a contact outer circumferential wall 13, and a module outer circumferential wall 14.

The optical axis direction partition wall 10 is a plate-like ring-shaped wall member disposed perpendicular to the optical axis. The optical axis direction partition wall 10 includes a module facing surface 10a facing in the subject direction and a contact facing surface 10b facing in the counter-subject direction. The plurality of circumferential direction partition walls 11 are plate-like wall members each of which protrudes from the contact facing surface 10b of the optical axis direction partition wall 10 into the counter-subject direction side and is disposed perpendicular to the circumferential direction. As shown in FIG. 19, the plurality of circumferential direction partition walls 11 are arranged along the circumferential direction. Referring to FIG. 5 again, the inner circumferential wall 12 is a cylindrical wall member that protrudes from the inner peripheral edge of the contact facing surface 10b of the optical axis direction partition wall 10 in the counter-subject direction and is disposed perpendicular to the radial direction. The contact outer circumferential wall 13 is a cylindrical wall member that protrudes from the outer peripheral edge of the contact facing surface 10b of the optical axis direction partition wall 10 in the counter-subject direction and is disposed perpendicular to the radial direction. The module outer circumferential wall 14 is a cylindrical wall member that protrudes from the outer peripheral edge of the module facing surface 10a of the optical axis direction partition wall 10 in the subject direction and is disposed perpendicular to the radial direction.

Further, an elongated contact accommodation chamber 15 for accommodating a contact 5 is formed along the radial direction by the optical axis direction partition wall 10, the circumferential direction partition walls 11, the inner circumferential wall 12, and the contact outer circumferential wall 13. That is, the optical axis direction partition wall 10 partitions off the contact accommodation chamber 15 on the subject direction side. The circumferential direction partition walls 11 partition off the contact accommodation chamber 15 on the circumferential direction side. The inner circumferential wall 12 partitions off the contact accommodation chamber 15 on the optical axis approaching direction side. The contact outer circumferential wall 13 partitions off the contact accommodation chamber 15 on the optical axis receding direction side. Further, the contact accommodation chamber 15 is partitioned off on the counter-subject direction side by the FPC 6 attached to the housing 4.

Further, as shown in FIG. 5, the optical axis direction partition wall 10 and the module outer circumferential wall 14 form a module engagement hollow 16 with which the camera lens module 3 is engaged. That is, the optical axis direction partition wall 10 partitions off the module engagement hollow 16 on the counter-subject direction side. The module outer circumferential wall 14 partitions off the module engagement hollow 16 on the optical axis receding direction side. The module engagement hollow 16 is opened on the optical axis approaching direction side and on the subject direction side.

(Contact Accommodation Chamber 15)

In this exemplary embodiment, a plurality of contact accommodation chambers 15 are formed in the housing 4. The plurality of contact accommodation chambers 15 have the same shape as each other. Therefore, only one of the plurality of contact accommodation chambers 15 is explained hereinafter, and explanations of the other contact accommodation chambers 15 are omitted.

As shown in FIG. 2, a plurality of contact insertion holes 20 are formed in the optical axis direction partition wall 10 of the housing 4. As shown in FIGS. 4 and 5, each of the contact insertion holes 20 is connected to a respective one of the contact accommodation chambers 15. In this exemplary embodiment, the hole direction of each contact insertion hole 20 coincides with the optical axis direction. As shown in FIG. 5, the contact insertion hole 20 is formed near the inner peripheral edge of the optical axis direction partition wall 10. As shown in FIG. 4, the contact insertion hole 20 has an inner circumferential surface 20a.

As shown in FIG. 5, a pair of circumferential direction partition walls 11 that partition off a contact accommodation chamber 15 on the circumferential direction sides have contact facing surfaces 11a that are opposed to a contact 5 accommodated in that contact accommodation chamber 15 in the circumferential direction. A press-fitting groove 21 is formed on each of the contact facing surfaces 11a of the pair of circumferential direction partition walls 11. Each press-fitting groove 21 is formed so as to adjoin the optical axis approaching direction side of the contact outer circumferential wall 13. Each press-fitting groove 21 is formed to extend in the optical axis direction.

Further, as shown in FIG. 5, the housing 4 includes a reinforcement rib 22 for reinforcing the optical axis direction partition wall 10. The reinforcement rib 22 is formed so as to have a cylindrical shape and protrude from the contact facing surface 10b of the optical axis direction partition wall 10 in the counter-subject direction.

(Contact 5)

In this exemplary embodiment, a plurality of contacts 5 have the same shape as each other. Therefore, only one of the plurality of contacts 5 is explained hereinafter, and explanations of the other contacts 5 are omitted.

As shown in FIG. 6, the contact 5 is formed from a conductive metal plate by performing a folding process, a drawing process, and a surface treatment with tin plating. The contact 5 is composed of a fixing part 30, a contact protrusion 31, and a connection part 32.

The fixing part 30 is a part that is fixed to the housing 4. The fixing part 30 is formed as a flat plate disposed perpendicular to the radial direction. A pair of claws 33 are formed in the fixing part 30. The pair of claws 33 are formed on the side edge on the circumferential direction side of the fixing part 30.

For example, as shown in FIG. 4, the contact protrusion 31 is a part that is inserted into the contact insertion hole 20, protrudes from the optical axis direction partition wall 10 into the camera lens module 3 side, and functions as an electric contact for the camera lens module 3. As shown in FIG. 6, the contact protrusion 31 is composed of a contact protrusion main body 34 and a flange 35. The contact protrusion main body 34 is a part that is formed by a drawing process so that it bulges into the camera lens module 3 side. The flange 35 is a part that is continuously formed without any gap in a ring shape along the peripheral edge of the end on the counter-subject direction sided of the contact protrusion main body 34. The flange 35 is formed in a plate-like shape and disposed roughly perpendicular to the optical axis.

Figure 7:
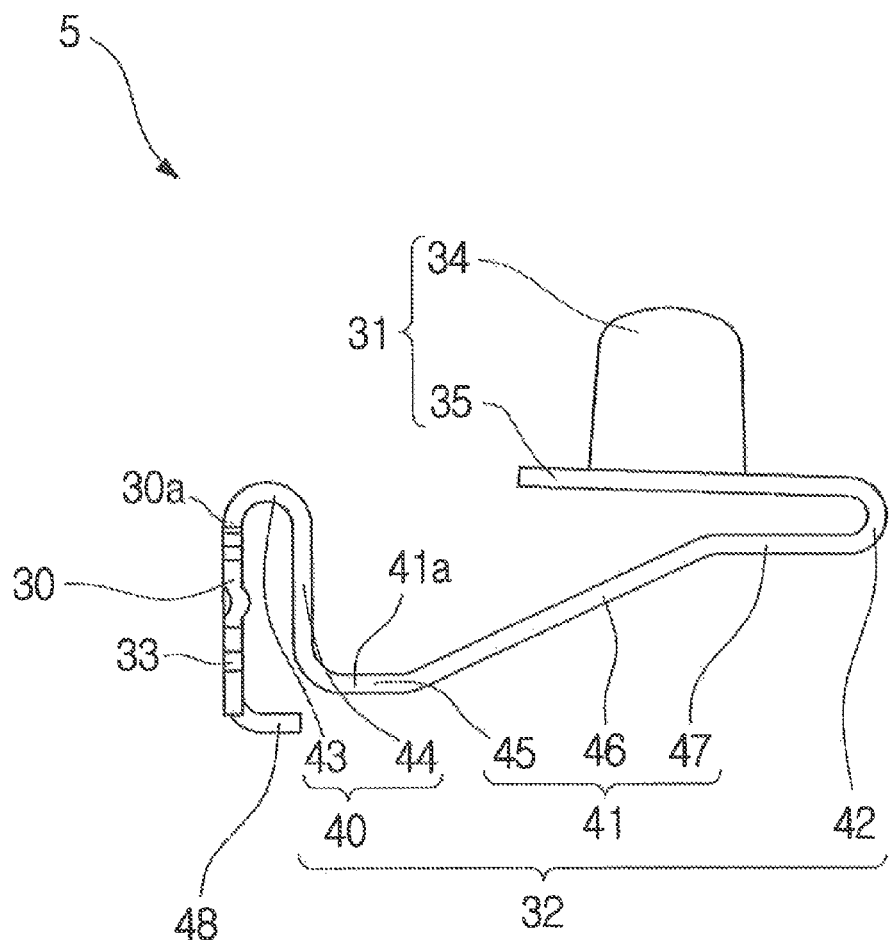
FIG. 7 is a side view of the contact (first exemplary embodiment)

The connection part 32 is a part that elastically connects the contact protrusion 31 with the fixing part 30. As shown in FIGS. 6 and 7, the connection part 32 is composed of a connection base end 40, a connection main body 41, and a folding part 42, which are disposed in this order from the fixing part 30 toward the contact protrusion 31.

The connection base end 40 is a part for connecting the end 41a on the fixing part 30 side of the connection main body 41 with the end 30a on the subject direction side of the fixing part 30. The connection base end 40 is composed of a curved part 43 and an extension part 44. The curved part 43 is a curved part that connects to the end 30a of the fixing part 30 and is folded by 180 degrees toward the optical axis approaching direction side. The extension part 44 is a part that connects to the end 41a on the fixing part 30 side of the connection main body 41 and extends in the optical axis direction.

The connection main body 41 is a part that extends roughly in the optical axis approaching direction so as to recede from the fixing part 30. The connection main body 41 is composed of a first horizontal part 45 horizontally extending on the optical axis receding direction side, an inclined part 46 that is inclined toward the subject side while extending in the optical axis approaching direction, and a second horizontal part 47 horizontally extending on the optical axis approaching direction side.

The folding part 42 is a part disposed on the opposite side to the fixing part 30 across the connection main body 41. The folding part 42 connects to the second horizontal part 47, which is the optical axis approaching side end of the connection main body 41, and is folded by 180 degrees toward the subject direction side and thus formed in a curved shape.

The contact 5 further includes a soldering part 48. The soldering part 48 is a part that is to be soldered to an electrode pad 7 of the FPC arc part 6a of the FPC 6 shown in FIG. 2.

When each part of the above-explained contact 5 is listed starting from the soldering part 48, they are connected in the order of the soldering part 48, the fixing part 30, the curved part 43 of the connection base end 40, the extension part 44 of the connection base end 40, the first horizontal part 45 of the connection main body 41, the inclined part 46 of the connection main body 41, the second horizontal part 47 of the connection main body 41, and the folding part 42 as shown in FIG. 7. Further, the contact protrusion 31 connects to the folding part 42. That is, the flange 35 of the contact protrusion 31 connects to the opposite end of the folding part 42 to the connection main body 41. In other words, the folding part 42 connects the connection main body 41 with the contact protrusion 31. To express it in another way, the contact protrusion 31 is located on the far side of the folding part 42 as viewed from the connection main body 41. Therefore, as viewed in the circumferential direction as shown in FIG. 7, the flange 35 of the contact protrusion 31, the folding part 42, and the second horizontal part 47 of the connection main body 41 are arranged so that they form roughly a U-shape. Similarly, as viewed in the circumferential direction, the fixing part 30, the curved part 43 of the connection base end 40, and the extension part 44 of the connection base end 40 are arranged so that they form roughly a U-shape.

Figure 8:
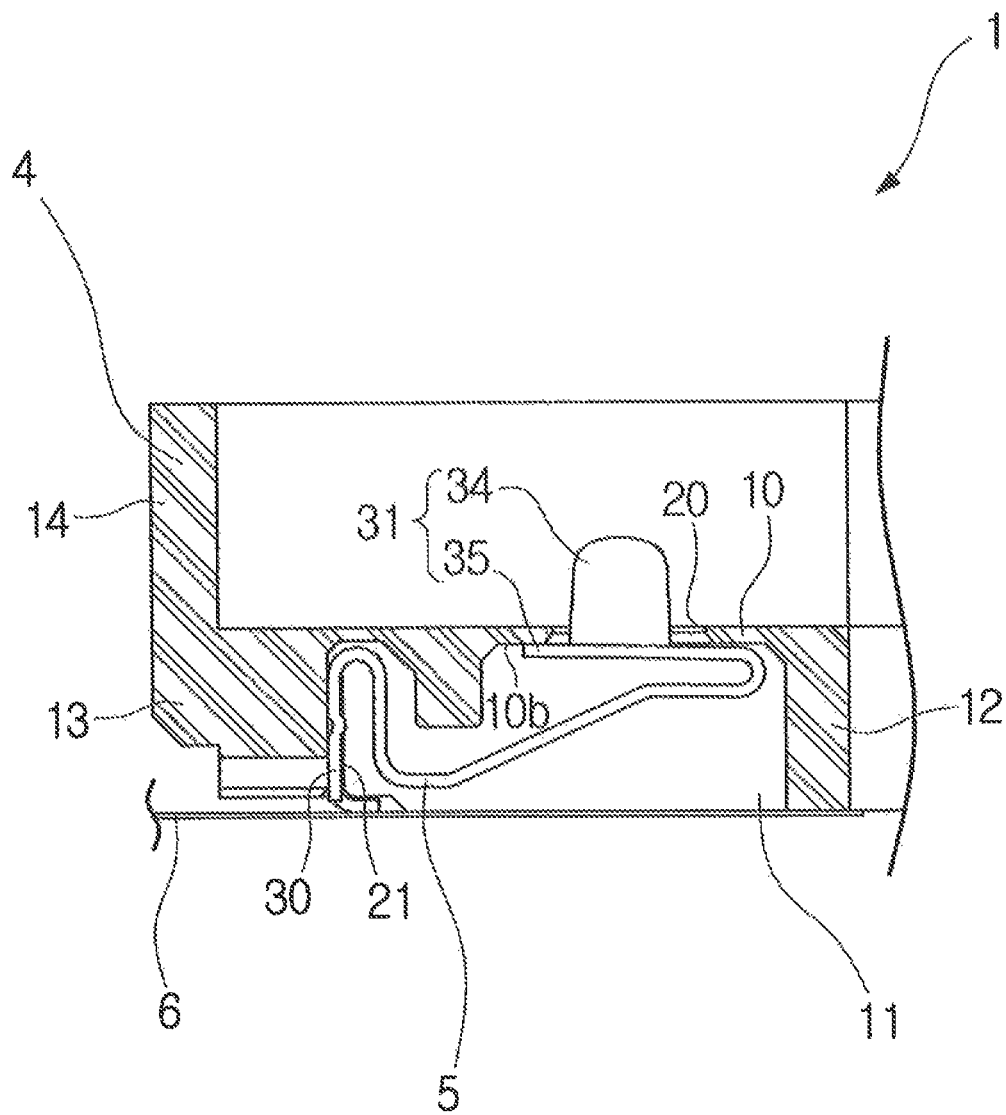
FIG. 8 is a cross section corresponding to FIG. 3 (first exemplary embodiment)

When the contact 5 having the above-described structure is accommodated into the contact accommodation chamber 15 of the housing 4, the fixing part 30 of the contact 5 is press-fitted with the press-fitting groove 21 of the circumferential direction partition wall 11 of the housing 4 while inserting the contact protrusion main body 34 of the contact protrusion 31 of the contact 5 into the contact insertion hole 20 of the optical axis direction partition wall 10 as shown in FIG. 8. By this press-fitting, the fixing part 30 of the contact 5 is fixed to the housing 4.

Note that the insertion direction of the contact protrusion main body 34 of the contact protrusion 31 of the contact 5 into the contact insertion hole 20 of the optical axis direction partition wall 10 of the housing 4 coincides with the subject direction. Further, the press-fitting direction of the fixing part 30 of the contact 5 into the press-fitting groove 21 of the circumferential direction partition wall 11 of the housing 4 also coincides with the subject direction. Therefore, it can be safely said that the insertion direction of the contact protrusion main body 34 of the contact protrusion 31 of the contact 5 into the contact insertion hole 20 of the optical axis direction partition wall 10 of the housing 4 is made roughly the same as the press-fitting direction of the fixing part 30 of the contact 5 into the press-fitting groove 21 of the circumferential direction partition wall 11 of the housing 4.

As shown in FIG. 8, when the contact 5 is attached to the housing 4, the contact 5 is in a pre-loaded state, i.e., a state where the flange 35 of the contact protrusion 31 of the contact 5 is brought into contact with the contact facing surface 10b of the optical axis direction partition wall 10 of the housing 4 by the spring restoring force of the connection part 32. Similarly to FIG. 8, FIG. 4 shows a pre-loaded state of the contact 5. As shown in FIG. 4, the flange 35 of the contact protrusion 31 is formed so that the flange 35 comes into contact with the contact facing surface 11a of the circumferential direction partition wall 11 in the circumferential direction before the contact protrusion main body 34 of the contact protrusion 31 comes into contact with the inner circumferential surface 20a of the contact insertion hole 20 in the circumferential direction in the pre-loaded state of the contact 5. That is, as viewed in the optical axis receding direction as shown in FIG. 4, a relation a<b always holds, where "a" is a gap between the flange 35 and the contact facing surface 11a of the circumferential direction partition wall 11 and "b" is a gap between the contact protrusion main body 34 and the inner circumferential surface 20a of the contact insertion hole 20.

Figure 9:
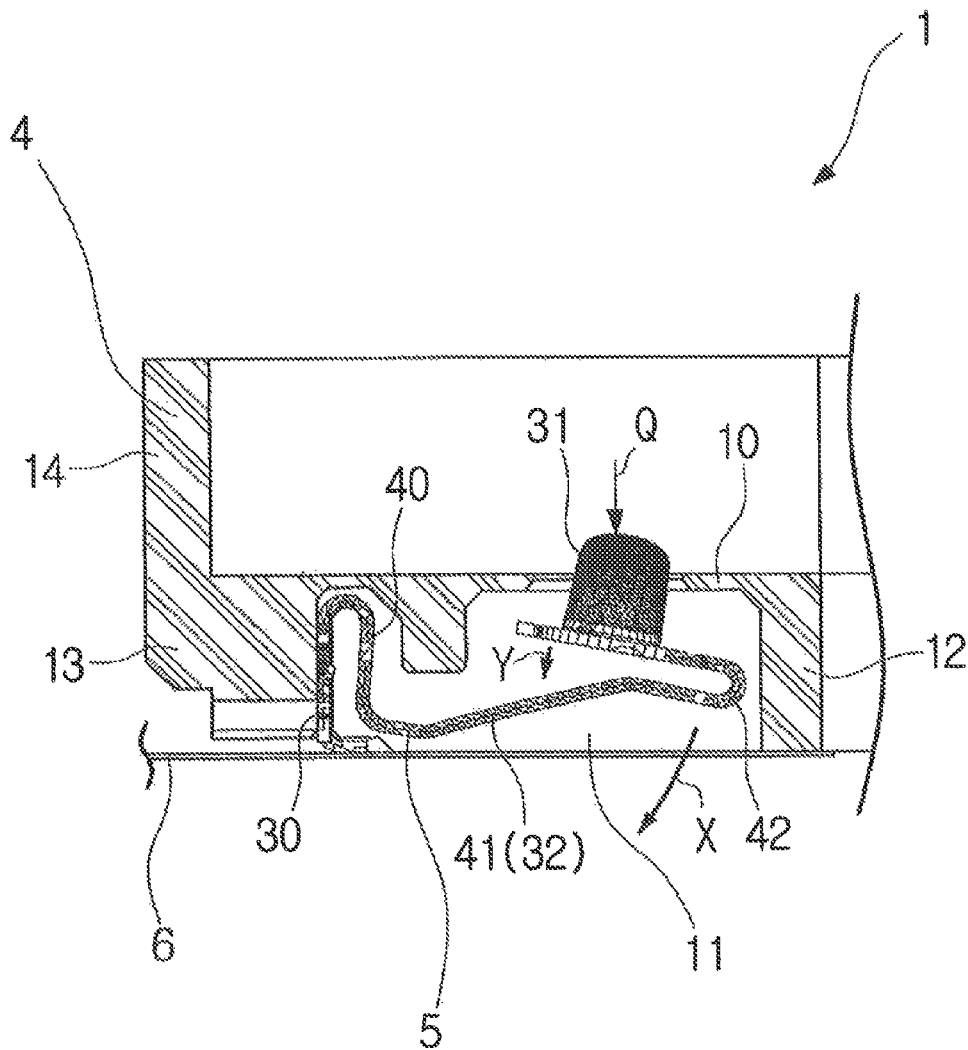
FIG. 9 is a cross section corresponding to FIG. 3 and shows a state where the contact is press down.

FIG. 9 shows a state where the contact protrusion 31 is pressed down to the counter-subject direction side as the camera lens module 3 (not shown) is attached to the camera main body 2. As shown in FIG. 9, when the contact protrusion 31 is pressed down to the counter-subject direction side by the contact load Q, the contact protrusion 31 is supposed to rotate clockwise around the fixing part 30 as indicated by an arrow X and is also supposed to rotate counterclockwise around the folding part 42 as indicated by an arrow Y at the same time. As a result, when the contact protrusion 31 is pressed down to the counter-subject direction side by the contact load Q, the contact protrusion 31 is displaced while maintaining roughly the same posture as viewed in the circumferential direction. Further, when the camera lens module 3 (not shown) is attached to the camera main body 2 and the contact protrusion 31 is thereby pressed down to the counter-subject direction side, the posture of the contact protrusion 31 slightly changes. As a result, the so-called "wiping effect" occurs between the contact protrusion 31 and the electric contact of the camera lens module 3.

A preferable first exemplary embodiment according to the present invention has been explained above. In summary, the above-described first exemplary embodiment has the following features.

(1) A mount optical connector 1 (electric connector) is disposed and used in a camera main body 2 for electrically connecting a camera lens module 3 with the camera main body 2. The mount optical connector 1 has an optical axis direction (first direction) substantially perpendicular to the optical axis P of the camera lens module 3, a radial direction (second direction) perpendicular to the optical axis direction as one specific direction among directions perpendicular to the optical axis direction, and a circumferential direction (third direction) perpendicular to the optical axis direction and the radial direction. The mount optical connector 1 includes a housing 4 with an elongated contact accommodation chamber 15 formed therein along the radial direction, and a contact 5 that is accommodated in the contact accommodation chamber 15 of the housing 4. The housing 4 includes an optical axis direction partition wall 10 (module side partition wall) that partitions off the contact accommodation chamber 15 on a camera lens module 3 side, and a contact insertion hole 20 is formed in the optical axis direction partition wall 10. The contact 5 includes: a contact protrusion 31 that is inserted into the contact insertion hole 20, protrudes from the optical axis direction partition wall 10 into the camera lens module 3 side, and functions as an electric contact for the camera lens module 3; a fixing part 30 fixed to the housing 4; and a connection part 32 that elastically connects the contact protrusion 31 with the fixing part 30. The connection part 32 includes a connection main body 41 extending in the radial direction so as to recede from the fixing part 30, and a folding part 42 disposed on the opposite side to the fixing part 30 across the connection main body 41. The fixing part 30 is disposed on the opposite side to the folding part 42 across the connection protrusion 31 in the radial direction. The above-described configuration makes it possible to reduce the length of the mount optical connector 1 in the optical axis direction.

(2) Further, the fixing part 30 is press-fitted with the housing 4 and thereby fixed to the housing 4.

(3) Further, the press-fitting direction of the fixing part 30 to the housing 4 is roughly the same as the insertion direction of the contact protrusion 31 into the contact insertion hole 20. The above-described configuration makes it possible to make the attaching task of the contact 5 to the housing 4 easier.

(4) Further, the connection part 32 further includes a connection base end 40 for connecting the end 41a on the fixing part 30 side of the connection main body 41 with the end 30a on the camera lens module 3 side of the fixing part 30.

(5) Further, the connection base end 40 includes a curved part 43 and an extension part 44. The curved part 43 connects to the fixing part 30 and is formed in a folded-back manner, and the extension part 44 connects to the connection main body 41 and extends in the press-fitting direction of the fixing part 30. With the above-described configuration, the connection main body 41 is elastically supported on the fixing part 30.

(6) Further, the contact protrusion 31 includes a contact protrusion main body 34 formed so as to bulge into the camera lens module 3 side, and a flange 35 continuously formed without any gap along the peripheral edge of the contact protrusion main body 34.

(8) Further, the housing 4 includes a pair of circumferential direction partition walls 11 (lateral partition walls) that partition the contact accommodation chamber 15 on circumferential direction sides. The flange 35 is formed so that the flange 35 comes into contact with one of the pair of circumferential direction partition walls 11 in the circumferential direction before the contact protrusion main body 34 of the contact protrusion 31 comes into contact with the inner circumferential surface 20a of the contact insertion hole 20 in a state where the flange 35 is in contact with the optical axis direction partition wall 10 by a spring restoring force of the connection part 32. Therefore, the contact protrusion main body 34 of the contact protrusion 31 is unable to come into contact with the inner circumferential surface 20a of the contact insertion hole 20. The above-described configuration makes it possible to prevent the generation of debris resulting from the contact between the contact protrusion main body 34 of the contact protrusion 31 and the inner circumferential surface 20a of the contact insertion hole 20, and thereby to keep the contact protrusion main body 34 clean. Therefore, the above-described configuration contributes to the contact reliability of the contact 5.

Note that the contact insertion hole 20 is formed in an elongated elliptic shape along the radial direction in advance so that the contact protrusion 31 never comes into contact with the inner circumferential surface 20a of the contact insertion hole 20 even when the contact protrusion 31 is pressed down and the contact protrusion 31 is thereby slightly inclined in the radial direction.

(10) Further, a mount optical connector 1 (electric connector) is disposed and used in a camera main body 2 (first component) for electrically connecting a camera lens module 3 (second component) with the camera main body 2 (first component). The mount optical connector 1 includes a housing 4 with a contact accommodation chamber 15 formed therein, and a contact 5 that is accommodated in the contact accommodation chamber 15 of the housing 4. The housing 4 includes an optical axis direction partition wall 10 (second component side partition wall) that partitions off the contact accommodation chamber 15 on a camera lens module 3 side, and a contact insertion hole 20 is formed in the optical axis direction partition wall 10. The contact 5 includes: a contact protrusion 31 that is inserted into the contact insertion hole 20, protrudes from the optical axis direction partition wall 10 into the camera lens module 3 side, and functions as an electric contact for the camera lens module 3; a fixing part 30 fixed to the housing 4; and a connection part 32 that elastically connects the contact protrusion 31 with the fixing part 30. The connection part 32 includes a connection main body 41 extending in a direction (radial direction, second direction) substantially perpendicular to the hole direction of the contact insertion hole 20 so as to recede from the fixing part 30, and a folding part 42 disposed on the opposite side to the fixing part 30 across the connection main body 41 and formed in a folded-back manner. The fixing part 30 is disposed on the opposite side to the folding part 42 across the connection protrusion in the radial direction. The above-described configuration makes it possible to reduce the length of the mount optical connector 1 in the hole direction (i.e. the optical axis direction) of the contact insertion hole 20.

(Second Exemplary Embodiment)

Next, a second exemplary embodiment according to the present invention is explained with reference to FIG. 10. In the following explanation, the differences of this exemplary embodiment from the above-described first exemplary embodiment are mainly explained and duplicated explanations are omitted as appropriate. Further, as a general rule, the same symbols are assigned to components corresponding to respective components of the above-described first exemplary embodiment.

In the above-described first exemplary embodiment, the contact 5 includes the soldering part 48 as shown in, for example, FIG. 7. The soldering part 48 is soldered to the electrodes pad 7 of the FPC 6 shown in FIG. 2.

In contrast to this, as shown in FIG. 10, an electrode pad(s) 50 that can come into contact with the folding part 42 of the connection part 32 when the camera lens module 3 is attached to the camera main body 2 is formed in the FPC 6 in this exemplary embodiment. In FIG. 10, the folding part 42 when it is displaced as the camera lens module 3 is attached to the camera main body 2 is shown in two-dot chain lines.

(Third Exemplary Embodiment)

Next, a third exemplary embodiment according to the present invention is explained with reference to FIGS. 11 and 12. In the following explanation, the differences of this exemplary embodiment from the above-described first exemplary embodiment are mainly explained and duplicated explanations are omitted as appropriate. Further, as a general rule, the same symbols are assigned to components corresponding to respective components of the above-described first exemplary embodiment.

As shown in FIG. 11, there is a possibility that the contact protrusion 31 is forcibly pressed down by, for example, using a sharp object such as a toothpick and a paper clip irrespective of the attachment of the camera lens module 3 to the camera main body 2. As a result, as shown in FIG. 11, a stress greater than the elastic limit of the folding part 42 could be exerted on the folding part 42.

Therefore, as shown in FIG. 12, the contact 5 further includes an elastic deformation regulation part 60 in this exemplary embodiment. The elastic deformation regulation part 60 is a part that protrudes from the inclined part 46 of the connection main body 41 of the connection part 32 toward the contact protrusion 31 and is able to come into contact with the flange 35 of the contact protrusion 31. The presence of this elastic deformation regulation part 60 can prevent a stress greater than the elastic limit of the folding part 42, which would otherwise be caused when the contact protrusion 31 undergoes excessive elastic displacement toward the connection part 32, from being exerted on the folding part 42.

(Fourth Exemplary Embodiment)

Next, a fourth exemplary embodiment according to the present invention is explained with reference to FIG. 13. In the following explanation, the differences of this exemplary embodiment from the above-described third exemplary embodiment are mainly explained and duplicated explanations are omitted as appropriate. Further, as a general rule, the same symbols are assigned to components corresponding to respective components of the above-described third exemplary embodiment.

As shown in FIG. 13, the contact 5 further includes an elastic deformation regulation part 61 in this exemplary embodiment. The elastic deformation regulation part 61 is a part that protrudes from the inclined part 46 of the connection main body 41 of the connection part 32 toward the FPC 6 and is able to come into contact with the FPC 6. The presence of this elastic deformation regulation part 61 can prevent a stress greater than the elastic limit of the connection base end 40, which would otherwise be caused when the connection part 32 undergoes excessive elastic displacement toward the FPC 6, from being exerted on the connection base end 40.

First to forth exemplary embodiments according to the present invention have been explained above. Next, first to fifth modified examples of the contact 5 are explained with reference to FIGS. 14 to 18.

(First Modified Example)

As shown in FIG. 14, the contact 5 includes a fixing part 70, a contact protrusion 71, and a connection part 72 in this modified example. The fixing part 70 is formed to extend in the optical axis direction. The connection part 72 is composed of a connection main body 73 and a folding part 74. The connection main body 73 connects to a counter-subject direction side end 70a of the fixing part 70. The connection main body 73 is formed so as to be inclined toward the subject direction side in the optical axis approaching direction.

(Second Modified Example)

As shown in FIG. 15, the contact 5 includes a fixing part 80, a contact protrusion 81, and a connection part 82 in this modified example. The fixing part 80 is formed to extend in the optical axis direction. The connection part 82 is composed of a connection main body 83 and a folding part 84. The connection main body 83 connects to a counter-subject direction side end 80a of the fixing part 80. The connection main body 83 is formed to extend in parallel with the radial direction.

(Third Modified Example)

As shown in FIG. 16, the contact 5 includes a fixing part 90, a contact protrusion 91, and a connection part 92 in this modified example. The fixing part 90 is formed to extend in the optical axis direction. The connection part 92 is composed of a connection base end 93, a connection main body 94, and a folding part 95. The connection main body 94 connects to a subject direction side end 90a of the fixing part 90 through the connection base end 93. The connection main body 94 is formed to extend in parallel with the radial direction.

(Fourth Modified Example)

As shown in FIG. 17, the contact 5 includes a fixing part 200, a contact protrusion 201, and a connection part 202 in this modified example. The connection part 202 is composed of a connection base end 203, a connection main body 204, and a folding part 205.

The connection base end 203 is composed of a curved part 206 and an extension part 207. The curved part 206 is a curved part that connects to a counter-subject direction side end 200a of the fixing part 200 and is folded by 180 degrees toward the optical axis approaching direction side. The extension part 207 is a part that connects to an end 204a on the fixing part 200 side of the connection main body 204 and extends in the optical axis direction. The length of the extension part 207 in the optical axis direction is roughly half the length of the fixing part 200.

The connection main body 204 is composed of a first horizontal part 208 extending in the radial direction on the optical axis receding direction side, a V-shaped part 209 protruding in roughly a V-shape into the counter-subject direction side, and a second horizontal part 210 extending in the radial direction on the optical axis approaching direction side. The V-shaped part 209 is able to come into contact with the FPC 6 (not shown) and has a function of preventing the excessive elastic deformation of the contact 5.

(Fifth Modified Example)

As shown in FIG. 18, the contact 5 includes a fixing part 300, a contact protrusion 301, and a connection part 302 in this modified example. The connection part 302 is composed of a connection base end 303, a connection main body 304, and a folding part 305.

The connection base end 303 is composed of a curved part 306 and an extension part 307. The curved part 306 is a curved part that connects to a counter-subject direction side end 300a of the fixing part 300 and is folded by 180 degrees toward the optical axis approaching direction side. The extension part 307 is a part that connects to an end 304a on the fixing part 300 side of the connection main body 304 and extends in the optical axis direction. The length of the extension part 307 in the optical axis direction is roughly half the length of the fixing part 300.

The connection main body 304 is composed of a first horizontal part 308 extending in the radial direction on the optical axis receding direction side and an inclined part 309 inclined toward the counter-subject side in the optical axis approaching direction on the optical axis approaching direction side.

A mount optical connector 1 disposed and used in a camera main body 2 for electrically connecting a camera lens module 3 with the camera main body 2 has been introduced above as an example of an electric connector according to the present invention. However, the use of an electric connector according to the present invention is not limited to the electric connection of the camera lens module 3 to the camera main body 2. That is, the use of an electric connector according to the present invention includes electric connections between various electric components.

REFERENCE SIGNS LIST

1 MOUNT OPTICAL CONNECTOR (ELECTRIC CONNECTOR)
2 CAMERA MAIN BODY (FIRST COMPONENT)
3 CAMERA LENS MODULE (SECOND COMPONENT)
4 HOUSING
5 CONTACT
6 FPC (CIRCUIT BOARD)
6a FPC ARC PART
6b FPC LEAD PART
7 ELECTRODE PAD
10 OPTICAL AXIS DIRECTION PARTITION WALL (MODULE SIDE PARTITION WALL, SECOND COMPONENT PARTITION WALL)
10a MODULE FACING SURFACE
10b CONTACT FACING SURFACE
11 CIRCUMFERENTIAL DIRECTION PARTITION WALL (LATERAL PARTITION WALL)
11a CONTACT FACING SURFACE
12 INNER CIRCUMFERENTIAL WALL
13 CONTACT OUTER CIRCUMFERENTIAL WALL
14 MODULE OUTER CIRCUMFERENTIAL WALL
15 CONTACT ACCOMMODATION CHAMBER
16 MODULE ENGAGEMENT HOLLOW
20 CONTACT INSERTION HOLE
20a INNER CIRCUMFERENTIAL SURFACE
21 PRESS-FITTING GROOVE
22 REINFORCEMENT RIB
30 FIXING PART
30a END
31 CONTACT PROTRUSION
32 CONNECTION PART
33 CLAW
34 CONTACT PROTRUSION MAIN BODY
35 FLANGE
40 CONNECTION BASE END
41 CONNECTION MAIN BODY
41a END
42 FOLDING PART
43 CURVED PART
44 EXTENSION PART
45 FIRST HORIZONTAL PART
46 INCLINED PART
47 SECOND HORIZONTAL PART
48 SOLDERING PART
50 ELECTRODE PAD
60 ELASTIC DEFORMATION REGULATION PART
61 ELASTIC DEFORMATION REGULATION PART
70 FIXING PART
70a END
71 CONTACT PROTRUSION
72 CONNECTION PART
73 CONNECTION MAIN BODY
74 FOLDING PART
80 FIXING PART
80a END
81 CONTACT PROTRUSION
82 CONNECTION PART
83 CONNECTION MAIN BODY
84 FOLDING PART
90 FIXING PART
90a END
91 CONTACT PROTRUSION
92 CONNECTION PART
93 CONNECTION BASE END
94 CONNECTION MAIN BODY
95 FOLDING PART
200 FIXING PART
200a END
201 CONTACT PROTRUSION
202 CONNECTION PART
203 CONNECTION BASE END
204 CONNECTION MAIN BODY
204a END
205 FOLDING PART
206 CURVED PART
207 EXTENSION PART
208 FIRST HORIZONTAL PART
209 V-SHAPED PART
210 SECOND HORIZONTAL PART
300 FIXING PART
300a END

301 CONTACT PROTRUSION
302 CONNECTION PART
303 CONNECTION BASE END
304 CONNECTION MAIN BODY
304a END
305 FOLDING PART
306 CURVED PART
307 EXTENSION PART
308 HORIZONTAL PART
309 INCLINED PART
a GAP
b GAP
P OPTICAL AXIS
Q CONTACT LOAD
X ARROW
Y ARROW

The invention claimed is:

1. An electric connector that is disposed and used in a camera main body for electrically connecting a camera lens module with the camera main body,
the electric connector comprising:
a housing with an elongated contact accommodation chamber formed therein along a radial direction perpendicular to an optical axis of the camera lens module; and
a contact that is accommodated in the contact accommodation chamber of the housing, wherein
the housing comprises a module side partition wall that partitions off the contact accommodation chamber, a contact insertion hole being formed in the module side partition wall,
the contact comprises a contact protrusion that is inserted into the contact insertion hole, protrudes toward the camera lens module, and functions as an electric contact for the camera lens module; a fixing part fixed to the housing; and a connection part that elastically connects the contact protrusion with the fixing part,
the connection part comprises a connection main body extending in the radial direction so as to recede from the fixing part, and a folding part disposed on an opposite side to the fixing part across the connection main body and formed in a folded-back manner,
the fixing part is disposed on an opposite side to the folding part across the contact protrusion in the radial direction,
the fixing part is press-fitted with the housing and thereby fixed to the housing,
the press-fitting direction of the fixing part to the housing is substantially the same as an insertion direction of the contact protrusion into the contact insertion hole, and
the connection main body includes an inclined part that is inclined toward the camera lens module while extending toward the folding part.

2. The electric connector according to claim 1, wherein the connection part further comprises a connection base end for connecting a fixing part side end of the connection main body with a camera lens module side end of the fixing part.

3. The electric connector according to claim 2, wherein the connection base end comprises a curved part and an extension part, the curved part connecting to the fixing part and being formed in a folded-back manner, the extension part connecting to the connection main body and extending in the press-fitting direction.

4. The electric connector according to claim 1, wherein the contact protrusion comprises a contact protrusion main body formed so as to bulge toward the camera lens module, and a flange continuously formed without any gap along a peripheral edge of the contact protrusion main body,
the module side partition wall includes a contact facing surface facing in a direction heading from the camera lens module toward the camera main body, and
the flange of the contact protrusion is capable of being brought into contact with the contact facing surface.

5. The electric connector according to claim 4, wherein the housing comprises a pair of lateral partition walls that partition off the contact accommodation chamber on a circumferential direction perpendicular to the radial direction and the optical axis, and the flange is formed so that the flange comes into contact with one of the pair of lateral partition walls before the contact protrusion main body of the contact protrusion comes into contact with an inner circumferential surface of the contact insertion hole in a state where the flange is in contact with the contact facing surface of the module side partition wall by a spring restoring force of the connection part, so that the contact protrusion main body of the contact protrusion is unable to come into contact with the inner circumferential surface of the contact insertion hole.

6. An electric connector that is disposed and used in a first component for electrically connecting a second component with the first component,
the electric connector comprising:
a housing with a contact accommodation chamber formed therein; and
a contact accommodated in the contact accommodation chamber of the housing, wherein
the housing comprises a second component side partition wall that partitions off the contact accommodation chamber, a contact insertion hole being formed in the second component side partition wall,
the contact comprises a contact protrusion that is inserted into the contact insertion hole, protrudes toward the second component, and functions as an electric contact for the second component; a fixing part fixed to the housing; and a connection part that elastically connects the contact protrusion with the fixing part,
the connection part comprises a connection main body extending in a radial direction so as to recede from the fixing part, the radial direction being substantially perpendicular to an optical axis direction, the optical axis direction being a hole direction of the contact insertion hole; and a folding part disposed on an opposite side to the fixing part across the connection main body and formed in a folded-back manner,
the fixing part is disposed on an opposite side to the folding part across the contact protrusion in the radial direction,
the fixing part is press-fitted with the housing and thereby fixed to the housing,
the press-fitting direction of the fixing part to the housing is substantially the same as an insertion direction of the contact protrusion into the contact insertion hole, and
the connection main body includes an inclined part that is inclined toward the second component while extending toward the folding part.

7. The electric connector according to claim 6, wherein the connection part further comprises a connection base end for connecting a fixing part side end of the connection main body with a second component side end of the fixing part.

8. The electric connector according to claim 7, wherein the connection base end comprises a curved part and an extension part, the curved part connecting to the fixing part and being formed in a folded-back manner, the extension part connecting to the connection main body and extending in the press-fitting direction.

9. The electric connector according to claim 6, wherein the contact protrusion comprises a contact protrusion main body formed so as to bulge toward the second component, and a flange continuously formed without any gap along a peripheral edge of the contact protrusion main body,
    the second component side partition wall includes a contact facing surface facing in a direction heading from the second component toward the first component, and
    the flange of the contact protrusion is capable of being brought into contact with the contact facing surface.

10. The electric connector according to claim 9, wherein when a direction perpendicular to the optical axis and radial directions is defined as a circumferential direction, the housing comprises a pair of lateral partition walls that partition off the contact accommodation chamber on the circumferential direction, and the flange is formed so that the flange comes into contact with one of the pair of lateral partition walls in the third direction before the contact protrusion main body of the contact protrusion comes into contact with an inner circumferential surface of the contact insertion hole in a state where the flange is in contact with the contact facing surface of the second component side partition wall by a spring restoring force of the connection part, so that the contact protrusion main body of the contact protrusion is unable to come into contact with the inner circumferential surface of the contact insertion hole.

* * * * *

UNITED STATES PATENT AND TRADEMARK OFFICE
CERTIFICATE OF CORRECTION

PATENT NO. : 9,614,313 B2  
APPLICATION NO. : 14/381481  
DATED : April 4, 2017  
INVENTOR(S) : Kazuya Mikawa Page 1 of 1

It is certified that error appears in the above-identified patent and that said Letters Patent is hereby corrected as shown below:

Column 17, Line 22, (Claim 10), after the phrase 'partition walls in the', delete the word "third", and insert the word --circumferential--.

Signed and Sealed this  
Tenth Day of July, 2018

Andrei Iancu  
*Director of the United States Patent and Trademark Office*